(12) United States Patent
Hickey et al.

(10) Patent No.: US 7,555,570 B2
(45) Date of Patent: Jun. 30, 2009

(54) DEVICE AND METHOD FOR CONFIGURING A TARGET DEVICE

(75) Inventors: John Hickey, Ratoath (IE); Ken Power, Galway (IE); Martin McDonell, Ennis (IE)

(73) Assignee: Avocent Huntsville Corporation, Huntsville, AL (US)

( * ) Notice: Subject to any disclaimer, the term of this patent is extended or adjusted under 35 U.S.C. 154(b) by 52 days.

(21) Appl. No.: 11/707,863

(22) Filed: Feb. 20, 2007

(65) Prior Publication Data

US 2007/0250649 A1    Oct. 25, 2007

Related U.S. Application Data

(60) Provisional application No. 60/774,186, filed on Feb. 17, 2006, provisional application No. 60/836,649, filed on Aug. 10, 2006, provisional application No. 60/836,930, filed on Aug. 11, 2006, provisional application No. 60/848,488, filed on Sep. 29, 2006.

(51) Int. Cl.
*G06F 3/00* (2006.01)

(52) U.S. Cl. .................... 710/8; 710/9; 709/220; 709/221; 709/222

(58) Field of Classification Search .................... None
See application file for complete search history.

(56) References Cited

U.S. PATENT DOCUMENTS

| | | | |
|---|---|---|---|
| 2004/0117473 A1* | 6/2004 | Yamamura et al. .......... 709/223 |
| 2004/0122931 A1 | 6/2004 | Rowland et al. | |
| 2005/0249207 A1 | 11/2005 | Zodnik | |
| 2006/0067350 A1* | 3/2006 | Clevy et al. ................. 370/419 |
| 2006/0161635 A1 | 7/2006 | Lamkin et al. | |
| 2006/0259612 A1* | 11/2006 | De Oliveira et al. ........ 709/224 |
| 2007/0033529 A1* | 2/2007 | de Kerf ....................... 715/734 |
| 2007/0115992 A1* | 5/2007 | Weinstock et al. .......... 370/392 |

OTHER PUBLICATIONS

U.S. Appl. No. 11/707,879, filed Feb. 20, 2007, Hickey et al.
U.S. Appl. No. 11/707,880, filed Feb. 20, 2007, Hickey et al.
U.S. Appl. No. 11/889,268, filed Aug. 10, 2007, Hickey et al.
U.S. Appl. No. 60/774,186, filed Feb. 17, 2006, Hickey.
U.S. Appl. No. 60/836,649, filed Aug. 10, 2006, Hickey.
U.S. Appl. No. 60/836,930, filed Aug. 11, 2006, Hickey.
U.S. Appl. No. 60/848,488, filed Sep. 29, 2006, Hickey.
"Avocent Install and Discovery Protocol Specification," Version 1.3, Avocent Corporation Jul. 9, 2003 [30 pages].
"Avocent Secure Management Protocol Specification," Version 1.8, Avocent Corporation Apr. 8, 2005 [64 pages].

(Continued)

*Primary Examiner*—Eron J Sorrell
(74) *Attorney, Agent, or Firm*—Davidson Berquist Jackson & Gowdey LLP

(57) ABSTRACT

An interfacing module connected to a network. A target network device connected to the network. An interfacing module is associated with a target network device. An interfacing module is coupled to a peripheral port of a target network device. Interfacing module identification data is stored in a memory portion of the target network device. The network address of the target network device is determined. The network address of the interfacing module is determined. At a remote location the network address of the target network device is used to read the interfacing module identification data from the memory portion of the target device via the network.

13 Claims, 27 Drawing Sheets

OTHER PUBLICATIONS

McCloghrie, K., "Management Information Base for Network Management of TCP/IP-based internets: MIB II," Network Working Group, Performance Systems International, Mar. 1991 [60 pages].

Search Report and Written Opinion mailed Jul. 16, 2008 in PCT Appln. No. PCT/US2007/17699.

* cited by examiner

DEVICE AND METHOD FOR CONFIGURING A TARGET DEVICE

RELATED PATENTS AND APPLICATIONS

The present application claims priority to U.S. Provisional Application Ser. No. 60/774,186, filed Feb. 17, 2006, U.S. Provisional Application Ser. Nos. 60/836,649, filed Aug. 10, 2006, 60/836,930, filed Aug. 11, 2006, and 60/848,488, filed Sep. 29, 2006 the entire contents of which are incorporated herein by reference.

The present application is also related to the following co-pending U.S. Patent Applications that are herein incorporated by reference in their entirety:
1. U.S. application Ser. No. 11/707,879, entitled "Video Compression Algorithm," filed Feb. 20, 2007,
2. U.S. application Ser. No. 11/707,880, entitled "Power Cycling," filed Feb. 20, 2007

Aspects of KVM systems, switches and related matter, including their operation, are described in the following U.S. Patents and U.S. Patent Applications, the entire contents of each of which are fully incorporated herein by reference:

U.S. Pat. No. 6,304,895, titled "Method and system for intelligently controlling a remotely located computer," filed Jul. 23, 1999 and issued Oct. 16, 2001;

U.S. Pat. No. 6,567,869, titled "KVM switch including a terminal emulator," filed Feb. 22, 2002 and issued May 20, 2003;

U.S. Pat. No. 6,681,250, titled "Network based KVM switching system," filed May 3, 2000 and issued Jan. 20, 2004;

U.S. Pat. No. 6,112,264, titled "Computer interconnection system having analog overlay for remote control of the interconnection switch," filed Feb. 4, 1999 and issued Aug. 29, 2000;

U.S. Pat. No. 6,378,009 titled "KVM (Keyboard, Video, and Mouse) switch having a network interface circuit coupled to an external network and communicating in accordance with a standard network protocol," filed Aug. 20, 1999 and issued Apr. 23, 2002; and U.S. patent application Ser. No. 09/951,774 titled "Passive video multiplexing method & apparatus," filed Sep. 14, 2001, published Oct. 3, 2002, Publication No. 2002-0143996.

FIELD OF THE INVENTION

This relates to a virtualized media system with high-quality audio-video performance and high-performance virtual USB extension.

INTRODUCTION

This system is a platform for the creation of an Ethernet-based IP KVM system with high-quality audio-video performance and high performance virtual USB "extension." The goal of the system is to enable a high-quality desktop experience for back-racked client target devices. Target devices are typically PCs and servers. The system architecture is focused on providing high-quality digital extension and back-racking. This includes extending KVM devices and USB peripherals, such as mass storage devices, over a network. The system is typically employed over a LAN, but as the underlying connection is IP-based it can be extended to work over a WAN. The system is designed to be implemented with minimal user initial configuration. It is an innovative solution to the weakness of current Thin-Clients (based on RDP or ICA) by ensuring constant video and audio experience no matter what the user is doing on the computer. Further, the system uses hardware engines that enable the full Ethernet pipe to be filled whether 10 Mbps, 100 Mbps or 1 Gbps. This is different from prior art KVM over IP implements in which this layer is performed in a software stack.

BRIEF DESCRIPTION OF THE DRAWINGS

The following description, given with respect to the attached drawings, may be better understood with reference to the non-limiting examples set forth with the drawings which are as follows.

DETAILED DESCRIPTION OF THE PRESENTLY PREFERRED EXEMPLARY EMBODIMENTS

Figure 1A:
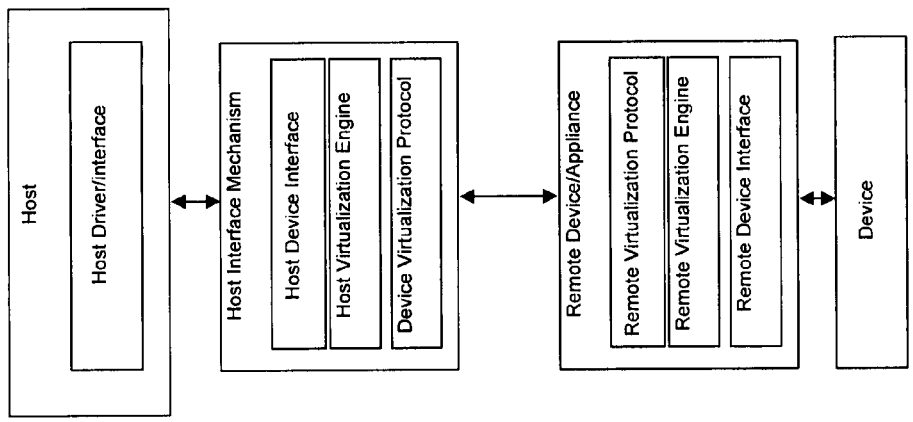
FIG. 1a: a schematic illustrating virtualization.

FIG. 1a is a schematic summarizing of the operation of remote virtualization of the system. The system creates a mechanism to virtualize so that a device driver on a host does not realize the device is remote and being accessed over a network. The system is realized with a combination of software and hardware.

The system is composed of two components—the host interface mechanism and the remote interface mechanism. The host interface mechanism is connected to the software driver layer in a host. This connection is over the normal host interfaces such as PCI or PCIe. The host interface mechanism looks to the software driver as the device that is being virtualized. For example, for virtualization of a USB Host Controller it provides the same register set and completes operations as if the actual USB Host Controller was there—the difference is the Host Interface Mechanism has to handle the fact that the action is actually happening in the Remote Interface Mechanism. The Remote Interface Mechanism actually drive the device being virtualized. The Remote Interface Mechanism receives commands from the Host Interface Mechanism and sends back replies to Host Interface Mechanism.

The host interface mechanism and remote interface mechanism are unique to the class of device being virtualized. For example, they would be unique remote and host interface mechanism for virtualizing a USB Host Controller chip and Audio chip. When virtualizing devices presenting industry standard interfaces the Remote Interface Mechanism and Host Interface mechanisms exchange capabilities and can auto negotiate to agree the virtualization capability set. In this way Remote Interface Mechanisms supporting different physical devices can interoperate with a specific Host Interface Mechanism.

The system is designed to virtualize a device so that it can be remotely accessed. This requires mechanisms to handle remoting of the interface mechanisms. This invention allows this virtualizing of a device to be performed without the software driver being aware of it.

The Host interface Mechanism and Remote Interface Mechanism interact with the host side device drivers and the remote virtualized device to make the host driver believe it is communicating with a local device. The Host Interface Mechanism and Remote Interface Mechanism are each composed of three core functional components.

The Host Device Interface is the device interface presented to the Host system (typically across a PCI or PCIe bus). The Host Device Interface is identical in register set and behavioural model to the device being virtualized. The Host system uses the same drivers and applications used with the real device to communicate across the Host Device Interface.

The Host Device Virtualization Engine maps the Interface presented to the Host to the Device Virtualization Protocol for communication with the Remote Interface Mechanism. The Host Virtualization Engine is aware of the remoting sensitivities of a specific device and applies a device specific virtualization algorithm that interacts with a compatible Remote Virtualization Engine in the Remote Interface Mechanism to "hide" the remoting of the real device from the Host system.

The Host Device Virtualization Engine and Remote Device Virtualization Engine communicate using the transport independent Device Virtualization Protocol.

The Remote Virtualization Engine interacts with the real device through the Remote Device Interface which communicates with the actual Virtualized device.

The Device Virtualization Engines operate with awareness of the device functionality and host system driver requirements to effectively virtualize devices over remote links. The associated algorithms are specifically optimized to accommodate bandwidth and latency characteristics of remote links. For example a set of specific algorithms accommodate virtualization of a USB 2.0 Host Controller, each algorithm focused on specific remoting aspect of a the USB 2.0 Host Controller Interface.

Alternative approaches used to solve this problem have been to emulate a device at both ends. The system described herein enables the virtualized device to behave and function as if locally connected using its native device drivers and exploiting the devices full functionality. This approach is not concerned with remoting the output from a specific hardware device being virtualized and as such does not have to content with resultant data transformation performed by the device. Such transformations are optimized for communicating with local peripherals and devices. This approach leads to an efficient and true virtualization of the device.

Figure 1B:
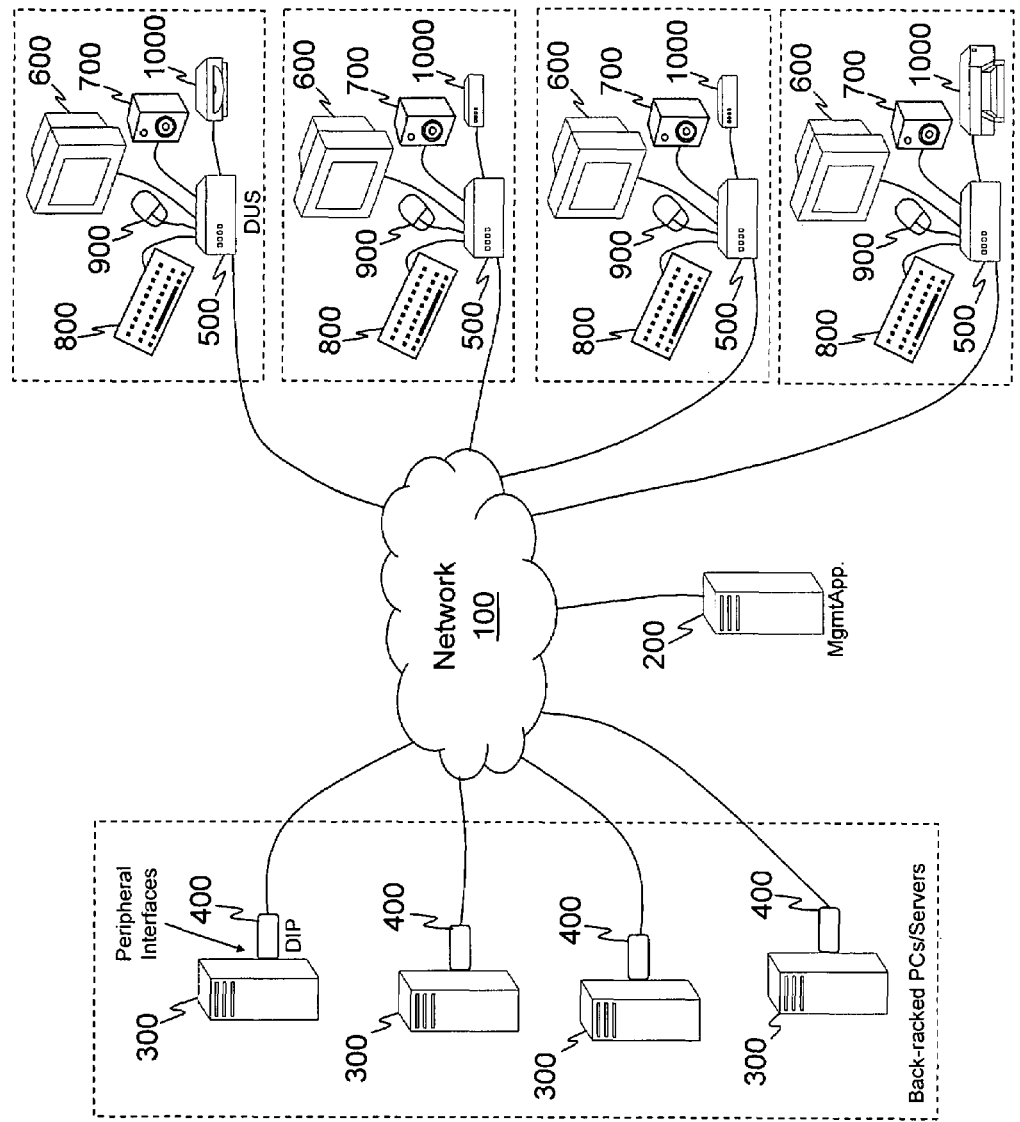
FIG. 1b: an exemplary virtualized media system.

FIG. 1b shows a general exemplary configuration of a virtualized media system and illustrates the main components in the system and basic connections between components. FIG. 1b is an exemplary embodiment of the schematic of 1a. The purpose of the system is to allow peripherals (KVM peripherals and a wide range of USB based peripherals) to access a target device across a network. In the exemplary embodiment there are four types of information that are transmitted across network 100. The four types of information are: video information, keyboard/mouse information, audio information, and media information. Each type of information is transmitted in a media stream. There are three main components of the system connected to network 100: Digitalizing Interface Pod (DIP) 400, Digital User-Station (DUS) 500, and Management Application (MgmtApp) 200. Network 100 is typically an IP-based LAN/WAN network. It should be noted, components will be able to work without issue if Network Address Translation (NAT) devices are used on network 100. In the exemplary embodiment, DUS 500 and DIP 400 will be hardware units and MgmtApp 200 will be a software application. In alternative embodiments, this could change so DIP 400 and DUS 500 are software embodiments and MgmtApp 200 embodied in hardware.

DIP 400 connects to the peripheral interfaces of a target device 300. DIP 400 transports the I/O streams between a target device 300 and network 100. Target devices 300 are typically back-racked PCs or servers, as shown in FIG. 1b, but are not limited to such. Target devices 300 can include any device with peripheral ports (e.g. media player, PDA, Set top box, etc.).

DUS 500 is essentially the inverse of a DIP 400. DUS 500 connects to various peripherals at a user station. DUS 500 transports I/O streams between network 100 and connected peripherals. Exemplary peripherals connected to DUS 500 shown in FIG. 1 include: PS/2 keyboard 800, PS/2 mouse 900, monitor 600, audio device 700, and USB peripherals 1000. USB peripherals 1000 can include any type of USB device including mass storage devices, a USB mouse and a USB keyboard.

Any number of combinations of DIPs 400 and DUSs 500 can be used in the system. However, in some instances, there is a single DUS 500 and DIP 400 pair. In such instances, network 100 can comprise a single cable directly connecting the pair or an IP subnet. Exemplary DUS 500 and DIP 400 will have network interfaces that enable them to operate over a 100 BT or 1 Gig copper cabled Ethernet network.

MgmtApp 200 is a software application that provides authentication, access control, and accounting services for a network of DIPs 400 and DUSs 500. MgmtApp 200 includes a database that stores information about each DIP 400 and DUS 500 connected to the network 100. It should be noted that MgmtApp 200 is not necessary when there is a single DUS 500 and DIP 400 pair. The single DUS 500 and DIP 400 pair is described in greater detail in accordance with FIG. 15. This MgmtApp 200 can be server based as shown or integrated into a network switch or appliance.

Figure 2:
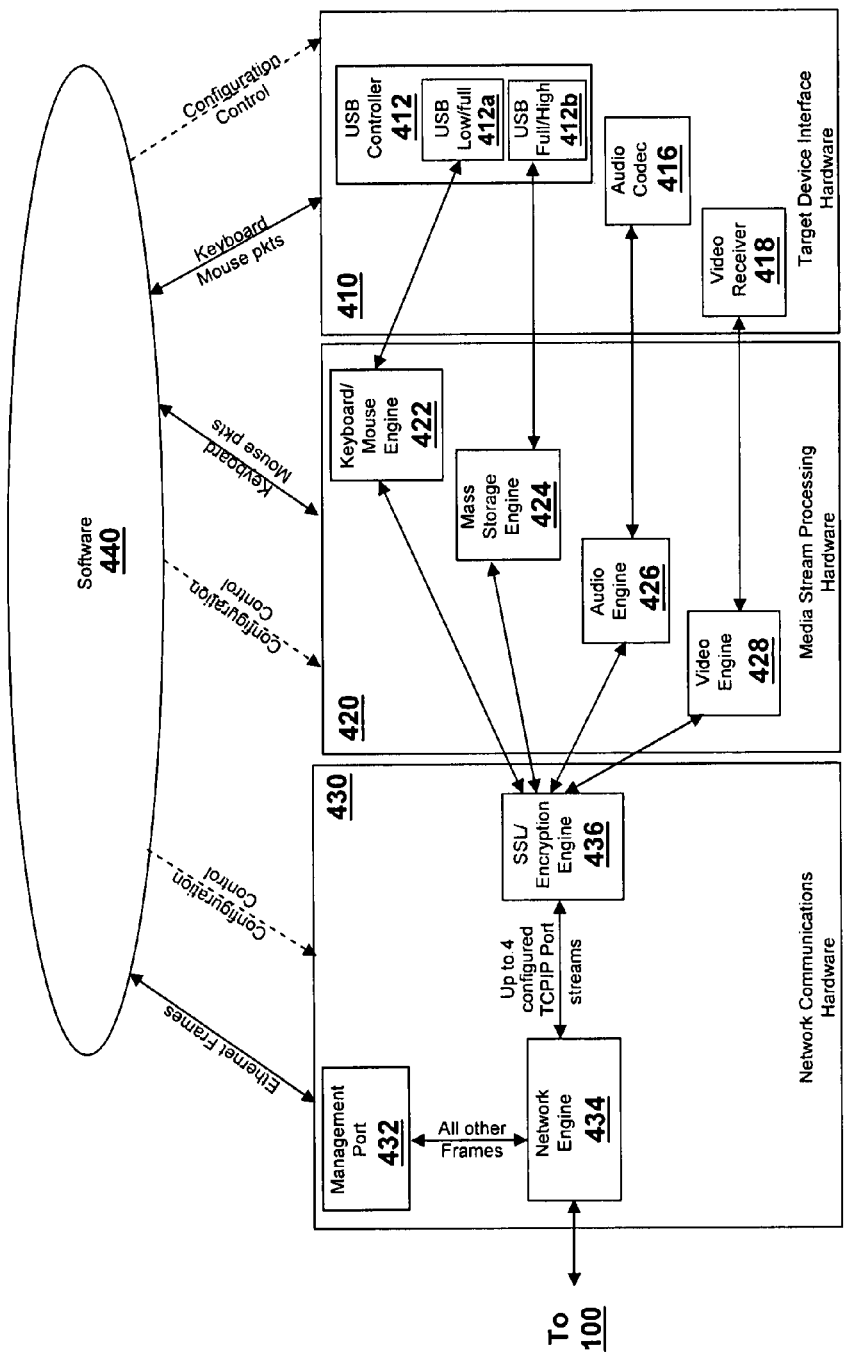
FIG. 2: an exemplary Digitizing Interface Pod.

An exemplary DIP 400 is shown in FIG. 2. DIP 400 is typically implemented as an external dongle that connects to the peripheral ports of a target device 300. However, a DIP 400 can also be embedded inside a target device 300. This may be in the form of a PCI card or as an embedded chip-set to be integrated by OEMs. Exemplary DIP 400 presents a target device 300 with a video connection, an audio connection, and a pair of USB connections.

For descriptive purposes, exemplary DIP 400 is shown as being comprised of three hardware functional blocks: target device interface hardware 410, media stream processing hardware 420, and network communications hardware 430. Each of the hardware functional blocks interacts with a software layer 440. Functional hardware blocks are typically embodied by an FGPA, but can also be implemented using an ASIC or other hardware implementations or combinations thereof. Using three functional blocks to describe DIP 400 is not intended to limit the ways in which a DIP 400 can be physically implemented.

Target device interface hardware 410 interfaces a target device's peripheral ports and media stream processing hardware 420. Target device interface hardware 410 converts data communicated between target device's peripheral ports and media stream processing hardware 420. An example of such a conversion is converting analog data output from a target device into a digital data form that can be processed by media stream processing hardware 420. Target device interface hardware 410 includes a USB peripheral controller 412, an audio codec 416, and a video receiver 418, each of which is described in greater detail with their respective media stream. Although not shown in FIG. 2, target device interface hardware 410 can also provide a serial connection for interfacing a target device's serial port.

Media stream processing hardware 420 interfaces target device interface hardware 410 and network communication hardware 430. Media stream processing hardware 420 packetizes/depacketizes data communicated between target device interface hardware 420 and network communication hardware 430. Media stream processing hardware 420 includes a keyboard/mouse engine 422, a mass storage engine 424, an audio engine 426, and a video engine 428, each of which is described in greater detail with their respective media stream.

Network communications hardware 430 interfaces network 100 and media stream processing hardware 420. Network communication hardware 430 receives data packets from media stream processing hardware 420 and converts the data into a form compatible with network 100. Network communication hardware 430 also receives data from network 100 and converts it into a form compatible with media stream processing hardware 420. Network communications hardware 430 includes management port 432, network engine 434, and SSL/encryption engine 436, each of which is described in greater detail in accordance with FIGS. 5 and 6.

Figure 3:
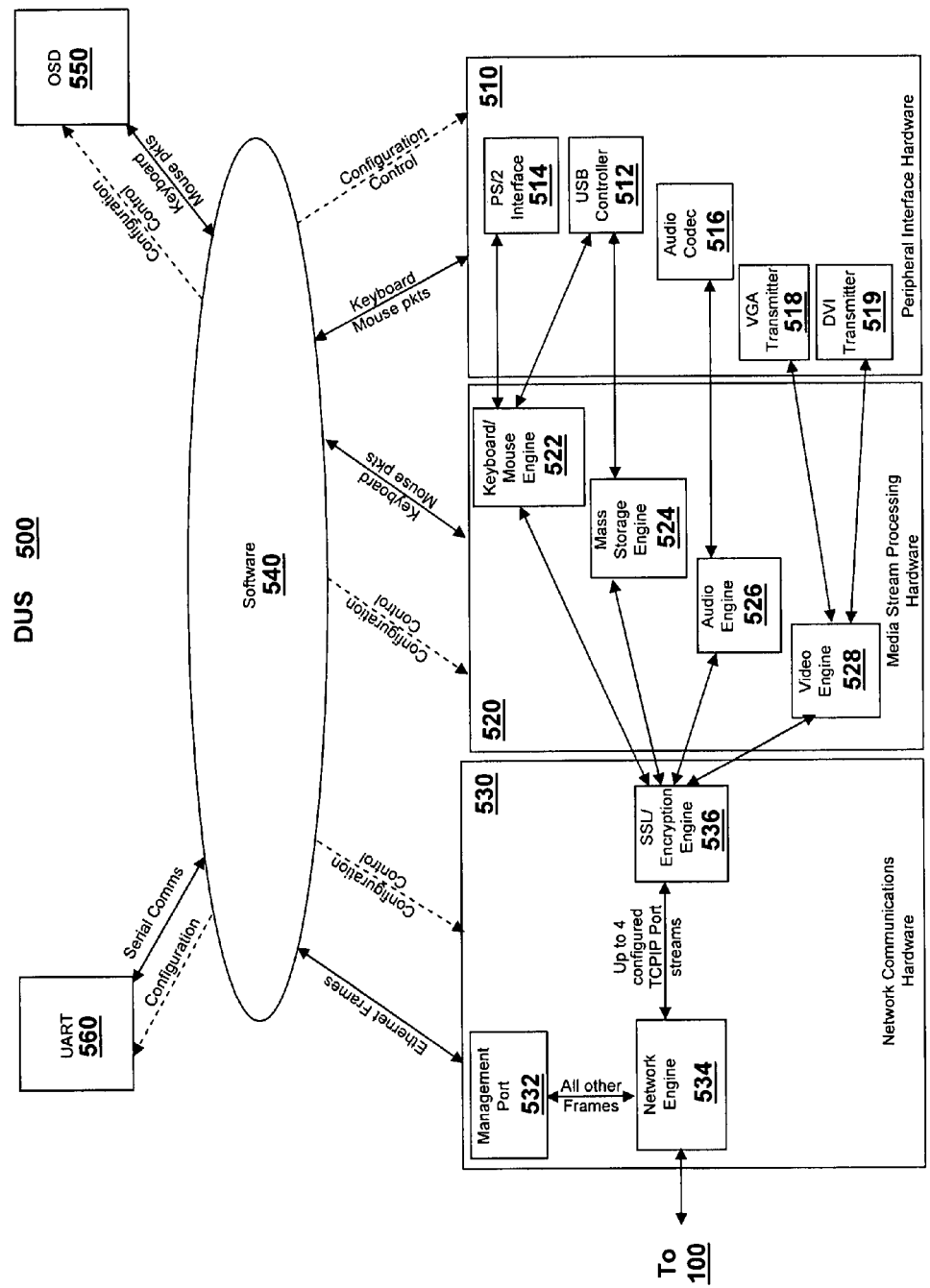
FIG. 3: an exemplary Digital-User Station.
Figure 4:
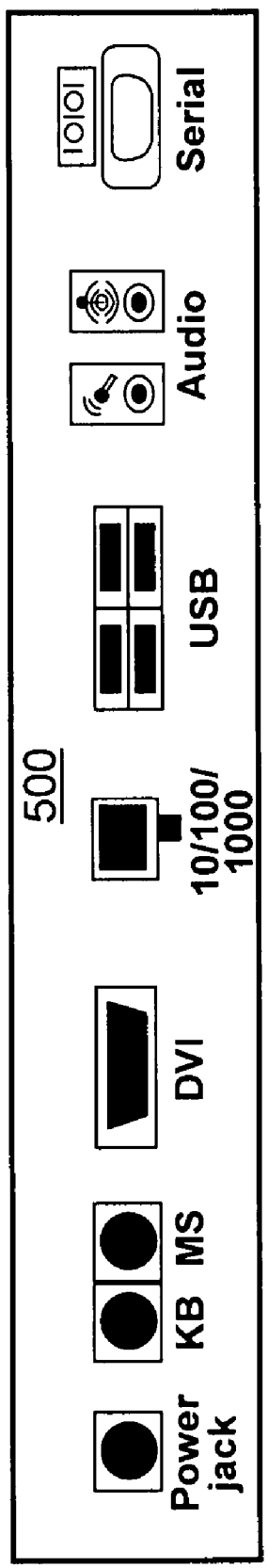
FIG. 4: an exemplary Digital-User Station interface panel.

An exemplary DUS 500 is shown in FIG. 3. Exemplary DUS 500 presents the following peripheral interfaces: a video connection (e.g. VGA and/or DVI), audio in/out connectors, PS/2 keyboard and mouse connectors, USB connectors for USB peripherals (e.g. keyboard, mouse, mass storage, and other USB peripherals), and a serial interface (e.g. RS232). FIG. 4 shows an exemplary DUS 500 panel illustrating interfaces.

For descriptive purposes, exemplary DUS 500 is shown as being comprised of three hardware functional blocks: peripheral interface hardware 510, media stream processing hardware 520, and network communications hardware 530. Each of the hardware functional blocks interacts with a software layer 540. DUS 500 also includes an on screen display (OSD) hardware 550 and universal asynchronous receiver/transmitter (UART) hardware 560. Using three functional blocks to describe DUS 500 is not intended to limit the ways in which a DUS 500 can be physically implemented.

Peripheral interface hardware 510 interfaces peripherals and media stream processing hardware 520. Peripheral interface hardware 510 converts data communicated between peripherals and media stream processing hardware 520. Peripheral interface hardware 510 includes USB controller 512, PS/2 interface 514, audio codec 516, VGA Transmitter 518, and DVI transmitter 519, each of which is described in greater detail with their respective media stream.

Media stream processing hardware 520 interfaces target device interface hardware 510 and network communication hardware 530. Media stream processing hardware 520 packetizes/depacketizes data communicated between target device interface hardware 420 and network communication hardware 430. Media stream processing hardware 520 includes a keyboard/mouse engine 522, a mass storage engine 524, an audio engine 526, and a video engine 528, each of which is described in greater detail with their respective media stream.

Network communications hardware 530 interfaces network 100 and media stream processing hardware 520. Network communication hardware 530 receives data packets from media stream processing hardware 520 and converts the data into a form compatible with network 100. Network communication hardware 530 also receives data from network 100 and converts it into a form compatible with media stream processing hardware 520. Network communications hardware 530 includes management port 532, network engine 534, and SSL/encryption engine 536, each of which is described in greater detail in accordance with FIGS. 5 and 6.

OSD hardware 550 provides a GUI that allows a local user to configure DUS 500.

UART 560 interfaces a serial port on DUS 500 and that allows data to be transferred to DUS 500. For example, a firmware upgrade of a DUS 500 can be accomplished by connecting a PC using XMODEM over a local RS232 port.

In the exemplary embodiment network communication hardware blocks 430 and 530 will transmit and receive up to four AES encrypted SSL/TPCIP streams. These streams are used to transport video, mass storage, audio, keyboard and mouse data between DUS 500 and DIP 400. The media stream processing hardware blocks 420 and 520 contains specific media processing hardware engines that source and sink data over the SSL/TCPIP streams. The four SSL streams shall be used as follows by the media processing engines:

Video—A dedicated SSL/TCPIP Port
Audio—A dedicated SSL/TCPIP Port
Keyboard & mouse—A dedicated SSL/TCPIP Port
Mass storage(vMedia)—A dedicated SSL/TCPIP Port The DUS 500 and DIP 400 require minimal software involvement to transfer the associated data streams. The hardware and software involvement in the data stream transport is described in greater detail below, in accordance the descriptions architecture and processing required for each media stream (video, mass storage, keyboard/mouse, audio). All other network communications go through the management ports 432 and 532.

Figure 5:
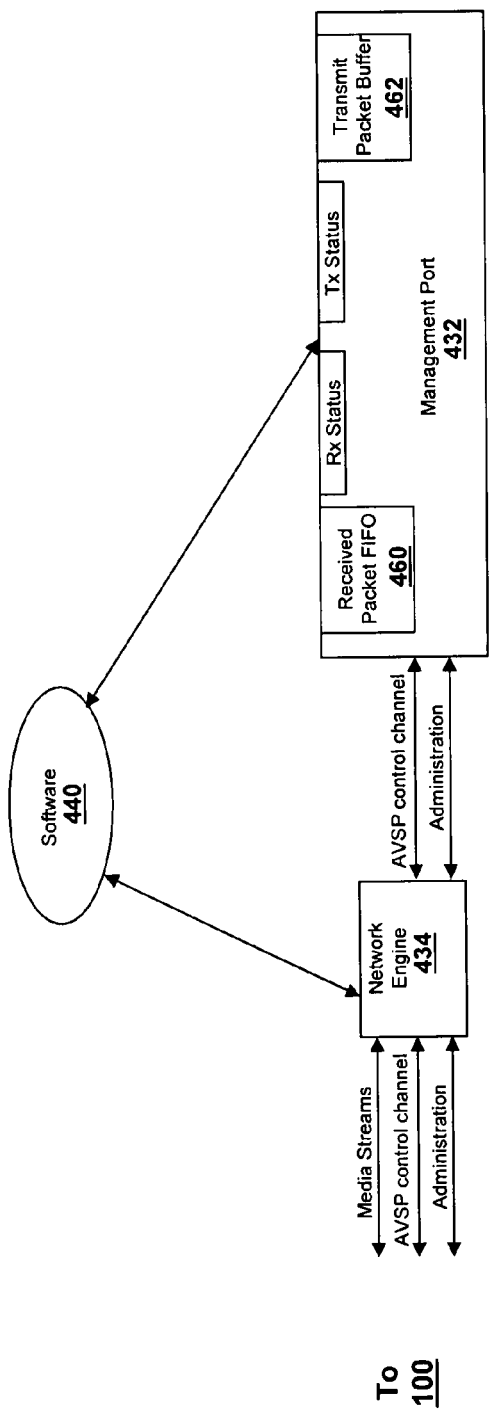
FIG. 5: exemplary management port architecture.
Figure 6:
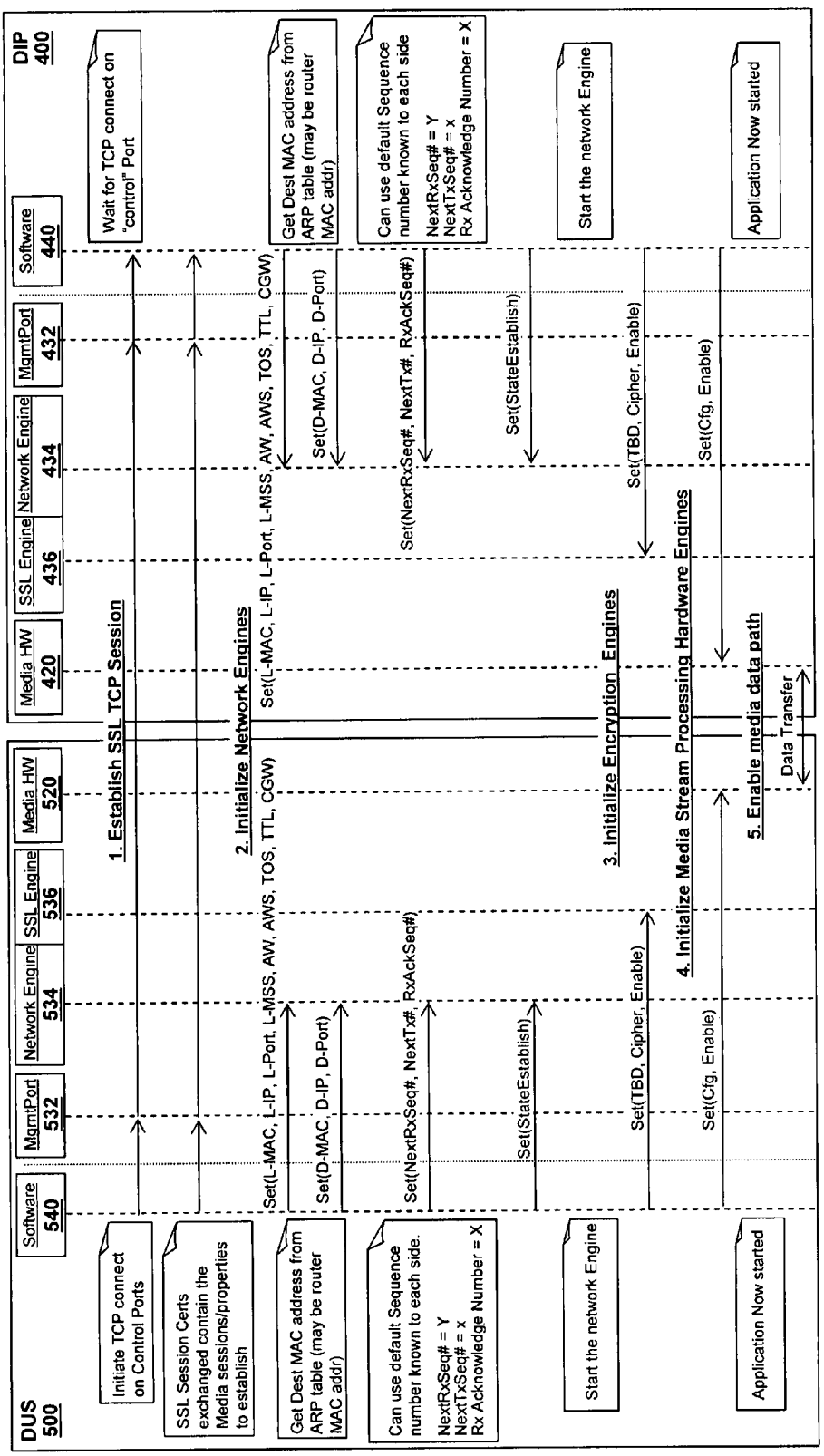
FIG. 6: an exemplary diagram illustrating a generic media session setup.
Figure 7:
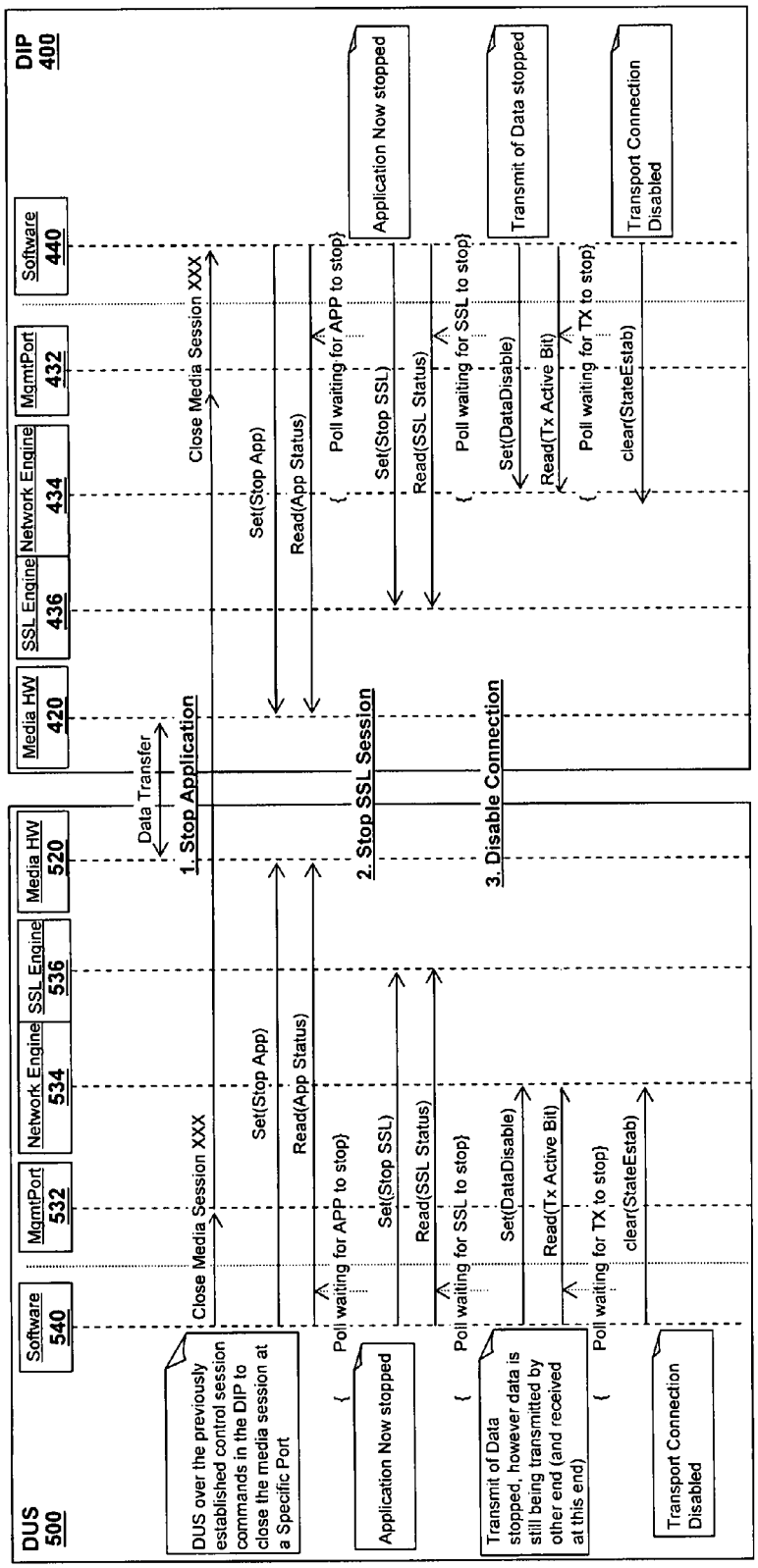
FIG. 7: an exemplary diagram illustrating a generic media session teardown.

The top level collaboration of software 440 and 540, media stream processing hardware 430 and 530 and network communication hardware components (i.e. management ports 432 and 532, network engines 434 and 534, and SSL engines 436 and 536) and the role they play in the establishment and teardown of a media transfer session (Video, Keyboard/Mouse, Audio, vMedia) for an initialized DIP/DUS pair is illustrated in FIGS. 5-7.

FIG. 5 illustrates an exemplary management port 432. The management port 432 presents a MAC level device interface to the software 440. All packets except those associated with TCP ports active on the network engine 434 are received by management port 432 and presented to software 440. The management port 432 has a receive packet FIFO buffer 460 and transmit packet buffer 462. In the exemplary embodiment, receive packet FIFO buffer 460 is an 8 Kbyte buffer and transmit packet buffer 462 is a 1.5 Kbyte buffer. All LAN packets addressed to the unicast MAC address programmed on the network engine 434 and broadcast IP and ARP packets are received and placed in the receive FIFO 460. Multicast packets are not received. A high watermark system will be used whereby if receive buffer 460 is filled over a specific percentage (e.g. 50%) all broadcast packets are discarded and counted until the receive buffer level reduces. If the receiver FIFO buffer 460 fills, unicast packets are also discarded and counted. Transmit buffer 462 stores packets before they are transmitted to network 100. The management port 432 has little explicit configuration other than that packet reception can be enabled/disabled and can be configured to interrupt when a packet transmit is complete or when a packet is in the receive FIFO buffer 460. It should be noted that management port 532 is similar to management port 432 and for the sake of brevity is not described herein.

In the exemplary embodiment, software 440 and 540 creates a TCP control channel between a DUS 500 and a DIP 400, after which the network engines 434 and 534 are configured at each end (a TCP port for each media stream) and TCP data transfer commences abruptly on the media session TCP ports (no SYN or FIN phases in media session establishment or teardown).

The exemplary embodiment uses an Avocent (Huntsville, Ala.) commercially available AVSP protocol format. It should be noted that although the exemplary embodiment is described using AVSP, other protocols can be used. An AVSP control channel is used to establish the session. The AVSP session is used for control of media sessions using a small subset of the AVSP message set. The media (video, keyboard, mouse, etc) transfer messages of AVSP are not used in the exemplary embodiment, all media transfer flows through the network hardware engines 434 and 534 using the specific media transfer sessions. The network engines 434 and 534 are architected to provide efficient data transfer using TCPIP sessions. The establishment and teardown of the TCPIP sessions is achieved in cooperation with a software SSL/TCP stack. The control channel is used for out of band media session control and session monitoring. All messages on this link use the AVSP protocol format. The exemplary embodiment uses a small and extended subset of the available AVSP messages, it does not use the media/data transfer AVSP messages, and the hardware engines use their own protocol. The channel is used to exchange session control messages between the DUS 500 and DIP 400 (changing media session properties etc).

FIG. 6 illustrates the process that is used for establishment of a media session. As shown in FIG. 6, the process is described as consisting of the following five steps: (1) Establish SSL TCP Session; (2) Initialize Network Engines; (3) Initialize Encryption Engines; (4) Initialize Media Stream Processing Hardware Engines; and (5) Enable Media Data Path.

In the Establish SSL TCP Session step, the DUS 500 initiates the connection to the AVSP server port on the DIP 400 (e.g. port 2068) and establishes an AVSP SSL connection with the DIP 400. The exemplary system shall only allow one AVSP session on a DIP 400. The session is authenticated using the session certs on the DUS 500 and AVSP keep alive between DUS 500 and DIP 400.

After the SSL TCP session is established, the Initialize Network Engines step occurs. Network engines 434 and 534 need to be configured with MAC and IP addressing information as well has having the TCPIP windowing and general operating parameters configured. If exponential back off is required, then software 440 and 540 must set the timeout accordingly.

The following core communication parameters must be configured on the hardware network engines 434 and 534:

MAC Data

Source MAC (L-MAC): This is the MAC address of the appliance (i.e. DIP 400 or DUS 500). It is available in persistent storage of the appliance.

Dest. MAC (D-MAC): The address is retrieved from the ARP table of the software stack after the DUS-DIP AVSP control session is established. This may not necessarily be the MAC address of the partner appliance involved in the connection.

IP Data

Source IP Address (L-IP): Obtained through DHCP or via static configuration of the IP address information on the appliance.

Destination IP Address (D-IP): Provided to the Appliance in the Session Cert. for the connection.

TOS: Type of Service field, describing the quality of service requested by the sender. The byte is composed of:
Precedence field (provides an indication of the priority): 0=normal, 1=priority, 2=immediate, 3=Flash, 4=Flash Override, 5=Critical, 6=Interwork Control, 7=Network Control. Recommend Setting to 5.
Delay Bit: 0 indicates can be delayed, 1 cannot be delayed. Recommend setting to 1.
Throughput Bit: 0=normal, 1=high, recommend setting to 1
Reliable bit: specifies if a reliable sub network is required. 0=not, 1=yes, set to yes.

TTL: Time to live. Number of Hops for IP packet, the following default value is recommended 255.

TCP Data

Port # (D-Port, L-Port): The following port numbers are recommended for the media transfer protocols:
Video: 4459
Audio: 4460
Keyboard/Mouse: 4461
Mass Storage: 4462

Max Segment Size (L-MSS): The largest block of data TCP will send to the other side. The recommended value for exemplary embodiment is 1460 bytes, the largest value that will keep each TCP transaction within one Ethernet packet so that the need to segment and reassemble the TCP packet is not required.

Advertised Window Size and Scale (AW and AWS): The size and scale of the TCP window that will be advertised to the other side. This effectively tells the other side of the connection how much data this unit can buffer and thus how much the other side can send. The optimum values can be determined through performance analysis of the system.

Congestion Window Size (CGW): If software 440 and 540 wishes to perform congestion control (the connection is frequently retransmitting packets and there may be congestion) it can use the "Congestion window size" to reduce the amount of data transmitted. When there is no congestion the congestion window is set to be the receivers' advertised window size. That is, a transmitter uses the receiver's advertised window to determine how much data to send. If it is determined that congestion is being experienced, the congestion window size can be reduced while congestion is being experienced, this reduces the window of data transmitted. A transmitter determines amount of data to transmit as being the smaller of the window advertised by the receiver and the local congestion window setting.

Retransmission Timeout Value: This value controls that retransmission and retransmission backoff. The retransmission timeout value is generally changed (using formula) based on the estimated Round Trip Time (RTT) for a connection. If variable retransmission timers and backoff are required, then software 440 and 540 needs to request the network engine 434 and 534 to calculate the RTT at intervals, and then use a smoothed average (SRTT) and the variance (RTTVAR) of the RTT samples to calculate a suitable timeout value as follows: Timeout=SRTT+4*RTTVAR.

Software 440 and 540 can also elect not to dynamically modify the timeout value, and set the retransmission timeout to a conservative value (possibly based on the initial value of RTT read) and maintain for the duration of the connection. This will be sufficient in well defined and controlled networks.

In addition to setting the parameters described above, software 440 and 540 needs to do the SYN transactions to establish the TCPIP session, and then transfer the sequence numbers (NextRxSeq#, NextTx#, and RxAckSeq#) to the network engine 434 and 534 for the data transfer.

After the network engines 434 and 534 are initialized, the Initialize Encryption Engine step occurs. DIP 400 and DUS 500 initialize the encryption engines 436 and 536 associated with each media stream that is enabled in the session cert. The encryption engines 436 and 536 encrypt and decrypt data transported by the TCPIP network engines 434 and 534. The engines 436 and 536 use 128 bit AES encryption on the media streams. The engine 436 and 536 will be used to encrypt video, mass storage, keyboard and mouse streams. The encryption must be configured with the 128 bit cipher key. This cipher key obtained as a result of the creation of the DUS-DIP AVSP control session SSL connection is used to seed the encryption of each media session. Thus, the key required to seed the SLL hardware encryption engines 436 and 536 is the same key that was generated after software SSL session negotiation. This guarantees that the key changes with each new connection.

After encryption engines 436 and 536 are initialized, the Initialize Media Stream Processing Hardware Engines step occurs. The DIP 400 and DUS 500 initialize the media application engines within media stream processing hardware 420 and 520. The DIP 400 and DUS 500 respective media engines (e.g. video processing engines 428 and 528) "tunnel" application specific control, setup, and session management data (known sequence numbers) through the AVSP control channel to enable setup to the specific media stream.

Once the respective media engines are initialized, The Enable Media Data Path step occurs. A connection is established between DUS 500 and DIP 400 and data streams are transferred by the hardware TCP "lite" engine called TOELite. The "lite" is used to refer to some basic optimizations made on the network engines 434 and 534 due to the fact that the system is optimized to run over a LAN.

On connection establishment, an external observer will see the media carrying TCP sessions start by transferring data without a TCPIP setup (SYN) or teardown (FIN) stage. Transferring data without a SYN or FIN stage will be tolerated by layer 3 switches and routers. However, going through layer 4 aware equipment like firewalls is an issue unless the specific ports are opened up on the firewall. The system of the exemplary embodiment will use fixed port numbers for each media stream on the DUS 500 and DIP 400, this way the specific ports can be opened on firewalls. The exemplary embodiment only uses the facility to enable keyboard, Mouse and vMedia session control entities on the DUS 500 and DIP 400 and to pass descriptors between the DUS 500 and DIP 400. However, it is available should other media applications require specific DUS-DIP communications.

FIG. 7 illustrates the process that is used for the teardown of a media session. As shown in FIG. 7, the process is described as consisting of the following three steps: (1) Stop Application; (2) Stop SSL Session; and (3) Disable connection. Software 540 initiates the FIN transactions to tear down the TCP session, again extracting the sequence number from the network engines 434 and 534. To the outside world the TCPIP session looks like one seamless session.

In FIG. 7, the Stop Application Step involves DUS 500 commanding DIP 400 to close a specific media session its specified port. After the application is stopped, the SSL session is stopped at the Stop SSL Session step. After the SSL session is stopped, that is transmission of data is stopped, the Disable connection step disables the transport connection.

FIGS. 8-13 illustrate operation of DUS 500 and DIP 400 for each specific media stream.

Figure 8:
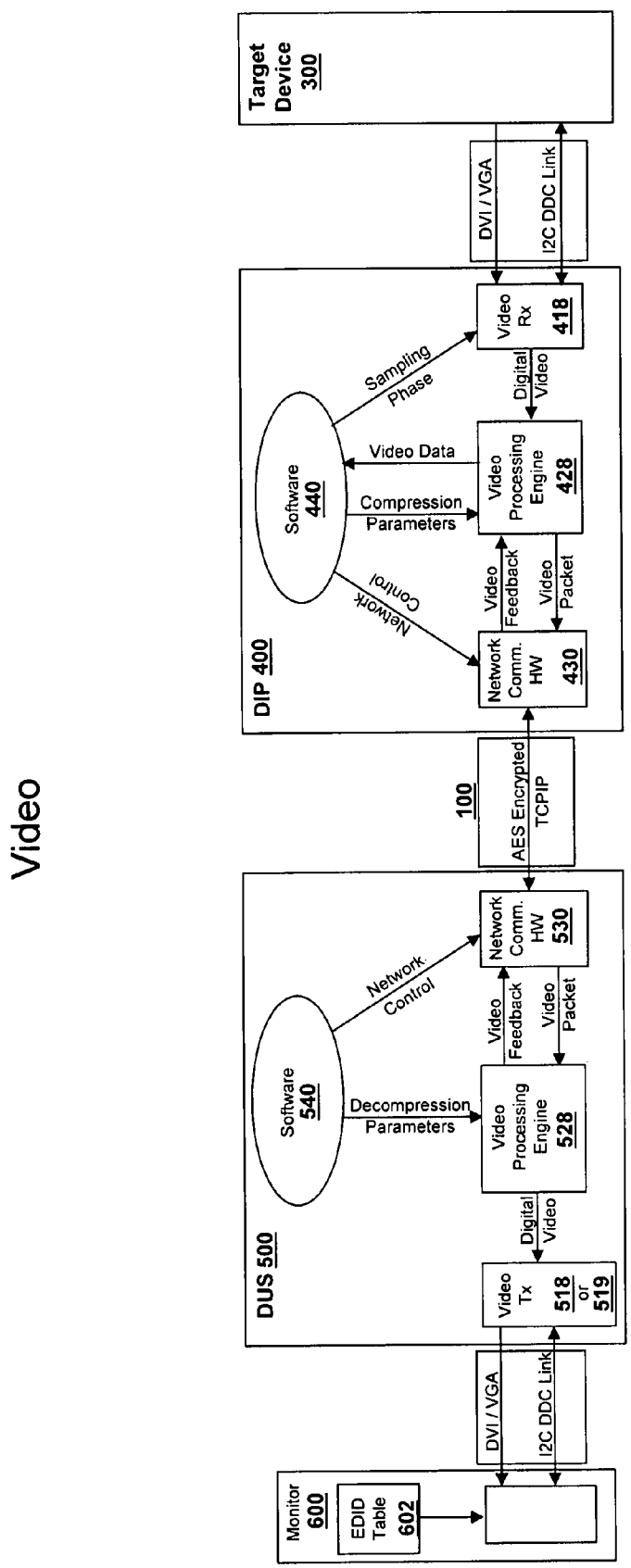
FIG. 8: an exemplary diagram illustrating components used with a video media stream.

The system components and behavior with respect to a video media stream are illustrated in FIG. 8.

DIP 400 presents a video interface to a target device 300. In the exemplary embodiment the video interface is a DVI-I interface. However, the video interface is not limited to a DVI-I interface and can include any number of video interfaces including analog (e.g. component video, S-video, etc.) and digital interfaces or combinations thereof. The interface is connected to video receiver 418. Exemplary video receiver 418 is a DVI/VGA(RGB) video receiver capable of receiving both DVI and VGA video data. Video receiver 418 can be adapted to receive various types of analog or digital video data.

On target device 300 power-up, target device 300 uses DDC to read the EDID table on the DIP 400. The DIP 400 has a hard-coded EDID table advertising the capabilities of the system.

Video receiver 418 can receive RGB video and supports resolutions up to at least 1280×1024@75 Hz. When video receiver 418 receives RGB or another type of analog video, video receiver 418 will digitize the video and forward it to the video processing engine 428. Software 440 configures video receiver 418 by specifying the optimum sampling of the VGA input signal (sampling phase). Software 440 adjusts the phase of the sampling clock used by the video receiver 418 to optimize the sampling of the analog input. It does this by continuously adjusting the phasing and looking at the data reported by the video engine 428 to get the optimum setting.

Video receiver 418 will capture digital video data from the DVI interface with support for resolutions up to at least 1280×1024@60 Hz. The digital video data will be forwarded to the video processing engine 428.

When DIP 400 presents a DVI-I connector to a target device 300, the DVI I2C DDC interface is routed so that the serial interface is made available to software 440 for processing of DDC requests from the target device 300.

The video receiver 418 can automatically detect the active input interface. For example, when DVI-I is used, video receiver 418 can automatically detect if RGB or digital DVI is being received. When receiving VGA, video receiver 418 needs to be adjusted by software 440 to align the clocking "phase." Software 440 does this by monitoring data made available by the video engine 428 and configuring the video receiver 418, then monitoring the data available by the video engine 428. This cycle is repeated until the optimum setting is reached.

Software 440 determines when a video source is detected by the video receiver 418, identifies the source, and then informs the video processing engine 428. Video processing engine 428 receives video from the video receiver 418 and prepares the video for the network communications hardware 430 by encoding the digital video.

Video processing engine 428 is configured by software 440. When the video processing engine 428 receives digitized video it makes available a number of observed/measured video characterizing data in its registers. Software 440 reads this data and based on pre-configured ranges deduces the VESA Video operating mode (table lookup for resolution, settings, etc.) after which it programs the video processing engine 428 for the chosen video mode.

In the exemplary embodiment, video processing engine 428 compresses the video by using a scheme based on the directional algorithm concepts previously developed with some newly added enhancements to compress frames of video. Its specific application is to reduce the bandwidth used in transmitting a video frame buffer across an Ethernet LAN. Video processing engine 428 uses the compression algorithm to create video packets.

The key to the algorithm is that each side of the link has a version of the previous frame to use as a reference. This allows each pixel in subsequent frames to be defined in one of the following several ways:

1. No change from pixel in previous frame (NO_CHANGE)
2. Same as pixel in line above (COPY_ABOVE)
3. Same as pixel as immediately to the left (COPY_LEFT)
4. Series of pixels from a preceding known subset (MAKE_SERIES)
5. Make new pixel (NEW_PIXEL or MAKE_PIXEL)
6. Delta from the same pixel in the previous frame (DELTA_NC)
7. Delta from the pixel immediately above (DELTA_CA)
8. Delta from the pixel immediately preceding to the left (DELTA_CL)
9. Short Delta from the same pixel in the previous frame (Short_Delta_NC)
10. Short Delta from the pixel immediately preceding (Short_Delta_CL)
11. Make Pixel using fewer bits (Short_Make_Pixel)

The compression algorithm is described in greater detail in co-pending U.S. application Ser. No. 11/707,879, entitled "Video Compression Algorithm" filed Feb. 20, 2007, which is incorporated herein by reference.

In the exemplary embodiment when video processing engine 428 compresses video, software 440 configures video processing engine 428 by specifying the following parameters: video mode (resolution) when VGA is used, the # of Intermediate frames used for color depth (range 0 to 7), the color depth on the reference and intermediate frames. (9, 12, 15, 18, 21, 24 bit color), the watermark for latency between DIP 400 and DUS 500 for frame dropping in units of 256 lines, the max frame rate expressed as a ratio with respect to the frame rate being received from the video receiver 418. Frame dropping can be set to drop all frames, drop every second frame (take a 60 fps video stream to a 30 fps video stream), or 1 in every 3 frames (takes a 60 fps stream to a 40 fps stream).

The video processing engine 428 compresses the video based on parameters set by software 440 and feedback from DUS 500. The compressed video is forwarded to network communication hardware 430 where network communication hardware 430 prepares compressed video for transmission over the IP network 100 to DUS 500.

The DUS 500 presents a video connector for connection to a monitor 600. The DUS 500 can present any appropriate video connector (e.g. component, S-video, DVI, VGA, etc.). In the exemplary embodiment, DUS 500 presents a DVI-I connector to a monitor 600. When the DUS 500 presents a DVI-I connector to a monitor 600, a VGA-to-DVI-I adaptor may be required depending on the cable available with the monitor 600. Further, when DUS 500 presents a DVI-I connection to a monitor 600. The I2C DDC channel on the DVI connector is presented to software 540 so it can query the monitor 600 for its EDID table. The DUS 500 on power-up reads the monitor 600 EDID table. If monitor 600 cannot support the full capabilities as advertised by the DIP 400 to the target device 300, a warning message is presented on the monitor 600.

Video engine 528 processes video data received over the IP network 100 and forwards it to the appropriate video transmitters 518 and/or 519 (depending on the video connector). Software 540 will need to configure the video engine 528 with the video mode (resolution) being used when VGA is used. The DIP 400 will inform the DUS 500 using an in-band command. On notification of the mode, software 540 looks up a table to find the setting associated with the mode. In the exemplary embodiment, software 540 will also specify the # of intermediate frames used for color depth (range 0 to 7), and the color depth on the reference and intermediate frames (9, 12, 15, 18, 21, 24 bit color) to video processing engine 528.

The DVI transmitter 519 receives digital video from video processing engine 528 and encodes and transmits the data on the DVI link to a monitor 600 without requiring involvement or any explicit configuration from software 540.

The RBG/VGA transmitter 518 receives digital video from video processing engine 528 and converts to RGB format for transmission to an attached monitor 600 without requiring involvement or any explicit configuration from software 540. DVI-I interface used in the exemplary embodiment supports H and V sync. In alternative embodiments sync on green is can also be supported.

Video packets created by video processing engine 428 are encapsulated in SSL/TCP packets of a fixed size for transmission across the network 100. Using fixed size packets enables the hardware based TCP transport engine 434 to be optimized to retransmit on a TCP packet basis rather than on a pure byte stream basis, thereby by maintaining a consistent bounded video frame received by video processing engine 528 without the need to manage byte stream re-transmit and associated packet reassembly in hardware.

TCP will guarantee the delivery of video packets in the correct order to video processing engine 528. Video processing engine 528 generates an explicit acknowledgement for each video packet received. The acknowledgement contains the current Frame# and Line# received by the video processing engine 528 for processing.

The acknowledgement is sent across network 100 to video processing engine 428. The DIP 400 is the controlling source for video flow control. An important aspect is to monitor the video latency across the system and adjust the video frame rate to the DUS 500 to maintain an acceptable latency. The DUS 500 displays all video frames sent to it. Video processing engine 428 uses the acknowledgment to understand how many lines the video receiver 418 is behind the video transmitter 518 or 519, this is a measure of the latency of the video between the video processing engine 528 and the video processing engine 428, and is a measure of the latency caused by each ends' encryption/TCP transport stack and network link. The DIP 400 monitors the Frame# and line# within the frame being processed by the DUS 500 with respect to the current Frame# and line# being processed by it. If these exceed specific thresholds the DIP 400 reduces the Frame rate to the DUS 500.

When the latency difference between the line being processed by the DUS video processing engine 528 and the line being processed by the DIP video processing engine 428 is greater than a configurable watermark then a frame will be dropped by DIP video processing engine 428, effectively reducing the frame rate until the latency is below the defined watermark. This mechanism minimizes the latency on the DIP-DUS video path which is important for mouse performance.

Software 440 can configure the color depth to be used by video processing engine 428 to manage the video experience and associated network bandwidth. The management of bandwidth is maximized by the use of reference and intermediate frames from the perspective of color depth, where software 440 can specify a number of frames (intermediate frames) between core references frames that carry a specified lower color depth.

When receiving VGA video, software 440 needs to monitor specific network engine data 434, and use it to deduce the video VESA mode settings from a table and then program video processing engine 428.

On setting the VESA mode in video processing engine 428, the video processing engine 428 sends an in-band video mode command to the DUS 500 informing it of the mode change. The DUS software 540 will read the mode change event, lookup the mode data, and program the DUS video processing engine 528 accordingly.

Figure 9:
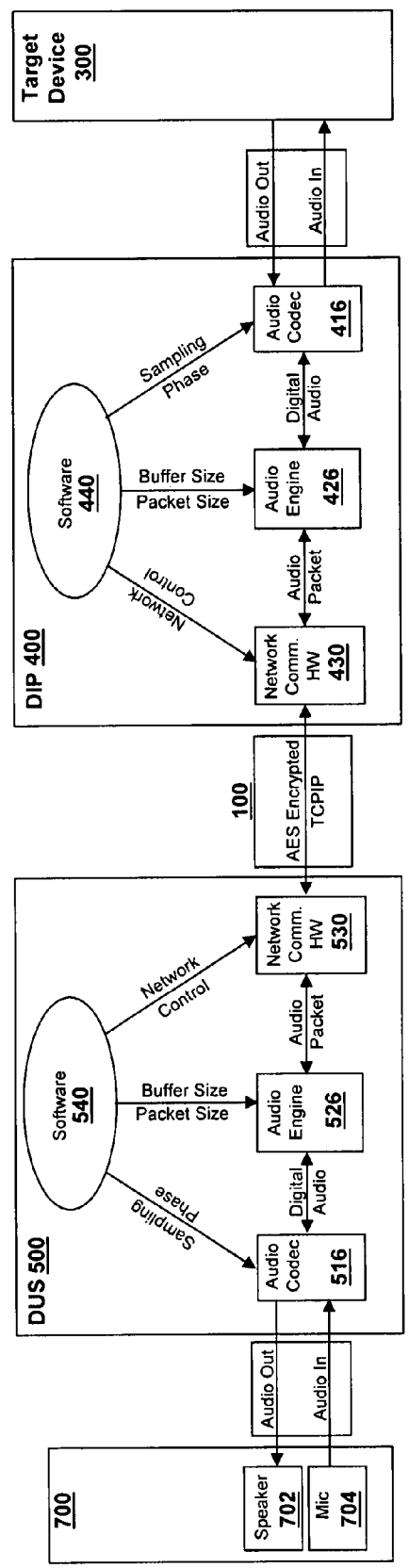
FIG. 9: an exemplary diagram illustrating components used with a audio media stream.

The system components and behavior with respect to an audio media stream are illustrated in FIG. 9.

DIP 400 presents audio connectors to a target device 300. In the exemplary embodiment the audio connector comprises a stereo connector (e.g. a 3.5 mm mini jack, a pair of RCA jacks, etc.) for audio output from target device 300 and a mono connector (e.g. a 3.5 mm mini jack or an RCA jack) for audio input to target device 300. The audio connectors present audio signals output from target device 300 to audio codec 416 and receives audio signals to be input to the target device 300. Audio codec 416 uses a basic linear quantization scheme to convert analog audio out signals into digital signals and forwards the digital signals to audio engine 426. Audio codec 416 also receives digital signals from audio engine 426. Audio codec 416 stores received digital signals in a playout buffer and converts the digital signals to analog signals which are presented to target device 300. In the exemplary embodiment, audio engine 426 and audio codec 416 are FPGA based.

DUS 500 presents audio ports to an audio peripheral 700. In the exemplary embodiment the audio ports comprises a stereo port (e.g. a 3.5 mm mini port, a pair of RCA ports, etc.) for a pair of speakers 702 and a mono port (e.g. a 3.5 mm mini jack or an RCA jack) for a microphone 704 or an audio input device. Audio codec 516 uses the audio ports to present audio signals to speakers 702 and receive audio signals from microphone 704. Audio codec 516 uses a basic linear quantization scheme to convert analog audio signals from microphone 704 into digital signals and forwards the digital signals to audio engine 526. Audio codec 516 also receives digital signals from audio engine 526. Audio codec stores the received digital signals in a playout buffer and convert the digital signals to analog signals which are presented to speakers 702. In the exemplary embodiment audio engine 526 and audio codec 516 are FPGA based.

In the exemplary embodiment, the system provides two 44.1 KHz sampled 16-bit channels (stereo) from a target device 300 to an audio peripheral 700 and a single 44.1 KHz sampled 16-bit channel from the audio peripheral 700 to the target device 300 (i.e. mono only transport). A 44.1 KHz sampling rate will provide transport of audio signals with frequency components up to 22 KHz. Because the audio peripheral 700 to target device 300 transport is a single channel, stereo microphones plugged into DUS 500 will result in transmission of a single channel to DIP 400, where the same signal is sent on each of the two channels to target device 300.

Audio engine 426 and 526 transmit and receive digitized audio over the IP network 100 using a system specific audio packet format. A transmit side takes the digitized audio stream from its codec, constructs an audio packet and forwards it to its network engine for transmission over the TCP link. The receiver side obtains the audio packets from its network engine and adds the data to the playout (jitter) buffer. The playout buffer makes a stream of samples available to its audio codec which converts the sample to analog form and plays out the audio. The audio packets transmitted on network 100 will have a structure that enables the transport of specified number of samples for up to two channels in a single packet.

It should be noted that although exemplary DIP 400 is described as receiving two audio channels from target device 300, such a description is for exemplary purposes only and is not intended to limit the number of audio channels DIP 400 can receive. DIP 400 can receive any number of audio channels (e.g. 5, 6, or 7 as used in surround sound systems). Likewise, DIP 400 can have multiple audio input channels. Further, although DIP 400 is described as sending/receiving analog audio signals to/from a target device 300, DIP 400 can be configured to receive digital audio signals and combinations of digital and analog audio signals.

Management of the playout buffer to accommodate variances in the received packet interval (network jitter) is vital to quality playout. The algorithm shall work in principle as follows.

After the connection is established, the receiver will commence playout of audio samples when it has the playout buffer 50% full. This enables the receiver to tolerate variances in the received audio samples of plus or minus the number of samples that are contained in 50% of the playout buffer.

If the playout buffer depletes, the previous sample is replayed until the next sample arrives. If the playout buffer is full, the playout recommences at the center of the playout buffer (the playout is reset to center of the playout buffer again).

To mitigate against having to take such abrupt actions that may result in an audible interference, the playout buffer has low and high water marks, set at 20% and 80% respectively. If the playout buffer goes below the 20% mark each sample is played out twice, until the buffer fills above 20% after which normal sample playout recommences. If the playout buffer goes above 80% every second sample is discarded until the buffer goes below 80% after which normal playout re-commences.

DVD playout requires the audio playout to be within plus or minus 80 ms of the video to maintain lip sync. The exemplary system takes no explicit action to attempt to keep audio and video in sync as the processing of network latencies are such that lip sync should be maintained. However, a mechanism can be added in alternative embodiments.

The performance of the audio streaming connection is primarily a function of the audio packet size, variance in network latency and playout buffer (jitter) size. The playout buffer size can be configured on an audio engine to accommodate 10 ms to 250 ms network jitter. An audio engine shall send 5 ms of audio for two streams in each packet. This is the minimum packet size to effectively operate with a 10 ms jitter buffer. The size of the audio packet determines the granularity of the jitter experienced by the receiver, the larger the packet the greater the efficiency of the transmission. However, there is also an increase in the impact to the audio quality due to changes in packet latency due to packet loss or congestion in the network 100.

To contain 5 ms of audio, an audio packet will need to be capable of carrying 882 bytes of raw sample data (excluding audio packet header, TCP, IP, and Ethernet headers). The playout buffer (jitter) size can be modified under software control. The buffer sizes required at the receiver to accommodate network jitter in the 10 to 250 ms range will be between 1764 bytes and 88200 bytes.

Playout buffer sizes for the exemplary embodiment can be calculated as follows:

44100×2 bytes=88200 bytes per second (88.2 bytes per ms) digitized audio stream. Stereo has two streams providing a total of 176.4 bytes per ms of audio.

5 ms of Audio=5×176.4=882 bytes

To accommodate+−10 ms network jitter, will require a buffer of 1764 bytes×2=3528 bytes.

To accommodate+−250 ms network jitter, will require a buffer of 44100 bytes×2=88200 bytes.

The system components and behavior with respect to a keyboard & mouse media stream and a mass storage media stream are illustrated in FIGS. 10-13.

Figure 10:
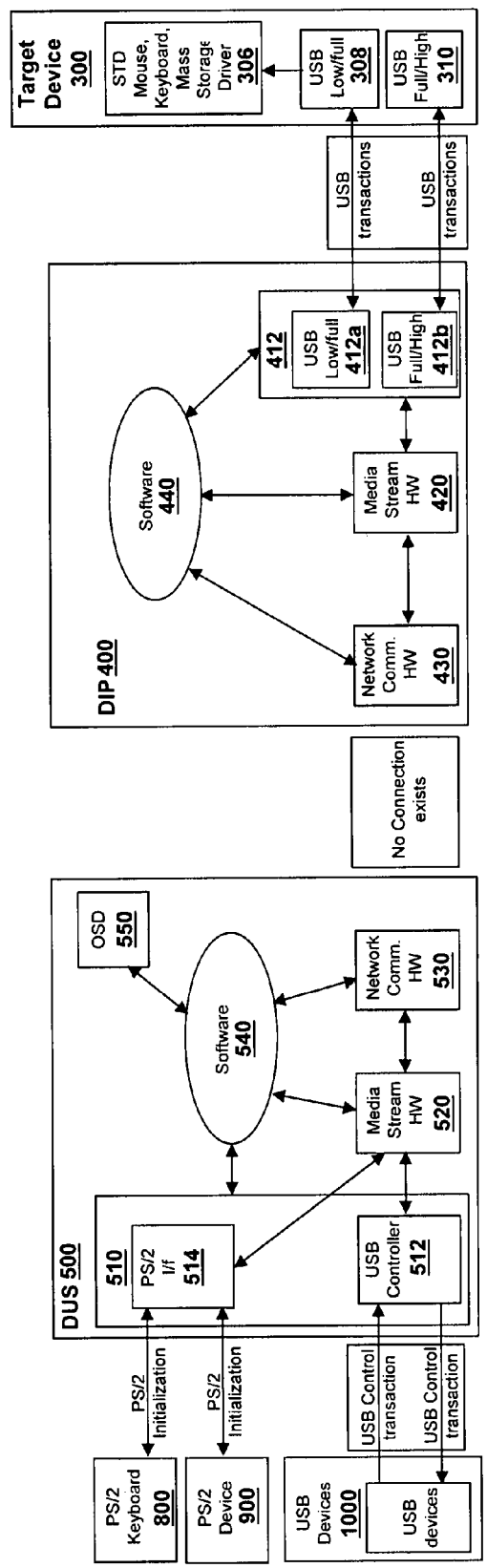
FIG. 10: an exemplary diagram illustrating components used with a USB and PS/2 peripherals at power up (no connection)

FIG. 10 illustrates the behavior on powerup of DUS 500 and DIP 400 before a connection between DUS 500 and DIP 400 is established.

DIP 400 presents a low/full speed capable USB port 412a and a full/high speed capable USB port to a target device 300. In the exemplary embodiment, the DIP/target device interface 412 is comprised of two peripheral controllers: low/full speed capable USB port 412a and a full/high speed capable USB port 412b.

The DIP 400 on power-up enumerates to a target device 300. Port 412a enumerates itself to a target device 300 as a composite USB device containing the following: a keyboard device with one interrupt endpoint for traffic from the keyboard that will provide a report descriptor describing a standard keyboard report format and a mouse device with one interrupt endpoint for traffic from the mouse that will provide a report descriptor describing a standard mouse report format. Port 412b enumerates itself to a target device as a mass storage device, using bulk only transport class with a subclass of "Transparent SCSI" command blocks. Target device 300 will load its standard keyboard, mouse and mass storage device drivers in response to this enumeration. The DIP 400 must be able power up and be in a state to let the target device 300 know that a keyboard is present before the target device 300 determines that it cannot see a keyboard.

The DUS 500 presents the following peripheral ports: a PS/2 mouse, PS/2 keyboard, and four USB ports where each USB port will accept low, full, or high speed USB peripherals.

The USB ports of DUS 500 interface a USB controller 512. USB controller 512 can be a commercial off-the-shelf host controller capable of low, full, and high speeds. In the exemplary embodiment, the USB ports will be four USB type-A connectors. However, another number or other types of USB connectors can also be used. In the exemplary embodiment, controller 512 is required at a minimum to be capable of simultaneously supporting three low/full speed devices and one high speed device. The USB driver implementation can be simplify by not supporting split USB transfers. This will mean that a high speed hub cannot be used to connect low/full speed devices to the DUS 500. The PS/2 ports of DUS 500 interface PS/2 interface 514. The PS/2 interface 514 can be implemented using a standard FPGA PS/2 implementation.

The DUS 500 on powerup will enumerate attached USB devices 1000 and initialize attached PS/2 keyboard 800 and mouse 900 peripherals. Devices 1000 are also enumerated on insertion post powerup. DUS 500 assigns an address to the device 1000 and reads its descriptors to identify and configure itself for the specific device.

Standard "keyboard/mouse" report descriptors are stored (hard coded) on the DUS 500 to be made available to the DIP 400 when a connection is established. PS/2 keyboard/mouse commands are translated to USB format on DUS 500.

Keyboard and Mouse data is made available to the OSD 550 when activated. When an OSD 550 is not activated all received keyboard and mouse data is discarded until a connection is established.

From the target device 300 perspective there is no mass storage device attached until a connection is made between DIP 400 and DUS 500. This way DIP 400 does not have to dummy SCSI responses to the target device 300 until a connection is established. Because on making a connection the target device 300 is forced to re-enumerate, it will re-issue the keyboard status on enumeration. LED and Caps lock settings or data packets for a keyboard or mouse sent from the target device 300 will not need to be stored for sending to the DUS 500 when the connection is made.

USB peripherals 1000 can be inserted into any one of the USB ports including low/full speed HUBs 412a. When DUS USB driver is not capable of handling split speed transactions (i.e. a mix of low/full and High speed devices can be inserted into the Hub, which will need to share one High speed link to the DUS), the insertion of high speed USB HUBs will not be available. For simplicity, support for HUBs on the DUS 500 can be excluded.

Figure 11:
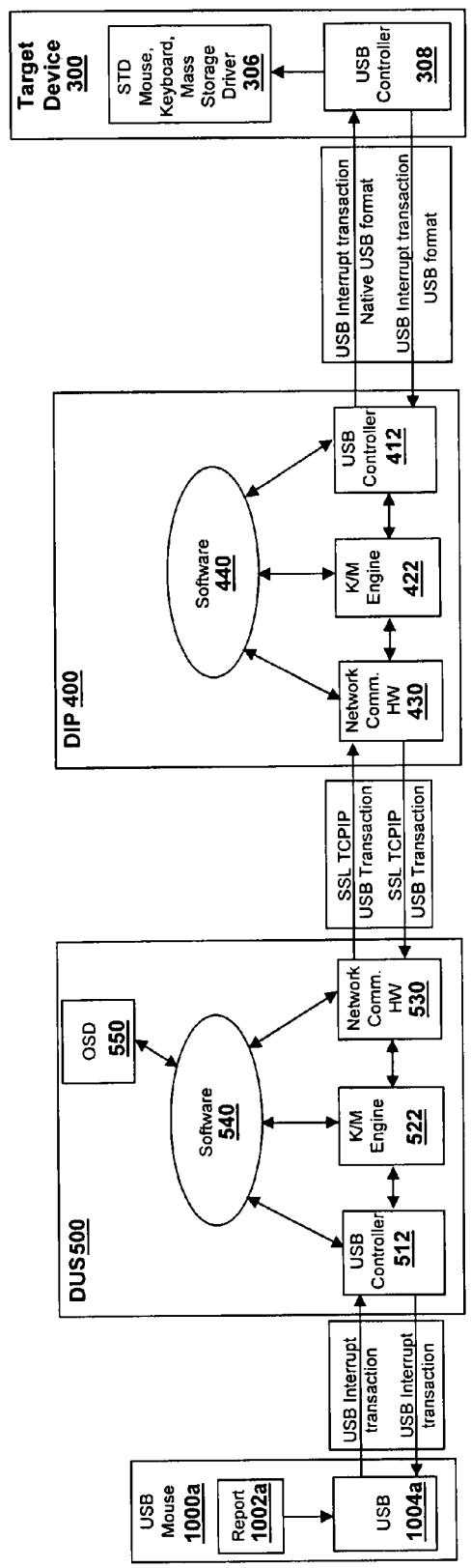
FIG. 11: an exemplary diagram illustrating components used with a USB Keyboard and Mouse media stream.

The exemplary system behavior with respect to USB Keyboard and Mouse connection control and data flow is illustrated in FIG. 11.

Before establishing a USB keyboard and mouse session the following conditions must be satisfied: DUS 500 and DIP 400 have been powered up, a USB keyboard and mouse have been enumerated by DUS 500, DUS 500 has established the AVSP control session with DIP 400, the network engines 434 and 534 have been enabled, and the keyboard and mouse session has been enabled on the session cert.

The DUS 500 sends the native report descriptors 904 for the enumerated keyboard and mouse to the DIP 400 over SSL/TCPIP using an extended AVSP command. Software 550 manages the transfer of keyboard and mouse data from USB controller 512 to network communication hardware 530. Implementations may choose to transfer the actual keyboard and mouse reports with software 550.

The DIP 400 receives the report descriptor 904 and forces re-enumeration of the composite keyboard & mouse USB port 308, reporting the new report descriptor to target device 300 in the enumeration. This will ensure that the native peripheral keyboard or mouse reports can be transported from a peripheral to target devices 300 without translation. This minimizes the processing of keyboard and mouse data, and can facilitate hardware to assist in the implementation. Other than control of the session software 440 is not involved in keyboard and mouse report transfer. Power is not removed from the peripheral 900 when the DIP 400 forces the target device 300 to re-enumerate after a connection is established. This means that it is feasible to transfer device or report 904 from the DUS 500 and report to the target device 300 by the DIP 400 by the time of connection establishment. It also means that the second port (first port has keyboard, mouse, mass storage) can be used for generic HID devices that use the keyboard and mouse protocol, enabling the correct driver to be loaded on the target device 300.

The DIP 400 having completed enumeration enables the keyboard and mouse data path. The DIP 400 will need to send the keyboard settings sent by target device 300 to DUS 500, so that the DUS 500 can initialize the keyboard LEDs, Cap Lock, Num Lock, etc. settings to be consistent with target device 300. The DUS 500 on receiving acknowledgement from DIP 400 of enumeration completion enables its keyboard and mouse path. Keyboard and mouse data now to flows between peripherals and the target device 300.

If a keyboard or mouse was not inserted on the DIP 400 prior to a DUS-DIP connection being made, the peripherals are enumerated on insertion and the sequence described above is followed once the report descriptors 904 are known to DUS 500. Removal of a keyboard or mouse does not result in an interaction with the DIP 400, it simply sees no keyboard or mouse data. The DIP 400 only re-enumerates as described when a device is inserted. The DUS 500 monitors each key stroke for the OSD activation key sequence. When the OSD activation key sequence is detected, the OSD 550 is activated and all keyboard and mouse traffic received from peripherals on the DUS 500 is directed to the OSD 550. When OSD 550 is dismissed, keyboard and mouse data flow on the DUS 500 is re-enabled.

DUS USB controller 512 must poll the device at the advertised rate. Typically max rate of every 8 ms for mouse/keyboard=125 transactions per second. Target device USB controller 308 must poll mouse and keyboard endpoints at the advertised rate. For example, 8 ms for mouse and 10 ms for keyboard may be advertised so as to never get a build up of packets. Alternatively a rate reported by the peripheral 900 to the DUS 500, can be advertised.

The USB keyboard report modifier byte can be scanned by hardware to detect active modifier key presses. An implementation may choose to implement this functionality in hardware for efficiency. OSD hot keys on the system can be one or more of the available modifier keys (shift, ctrl, etc.) pressed two times in sequence.

It is critical that the latency in sending mouse reports 904 from the peripheral 900 to the target device 300 is minimized to optimize the mouse latency as observed by the DUS 500 user. Reducing software involved in the mouse 900 to target device 300 path will greatly reduce the latency in this direction.

However, there is a natural latency introduced by virtue of the USB interrupt transfer device polling mechanism. A typical USB mouse attached to a PC could see the worst case up to 8 to 10 ms (assuming 8 or 10 ms polling of mouse by PC) latency from peripheral to PC. When the present system is added to the path the following latency is added to the peripheral to PC path: latency in DUS 500 (<1 ms worst case), latency in network 100 (assume <0.5 ms worst case), latency in DIP 400 (<1 ms worst case), and target device 300 to DIP 400 polling interval (worst case 8 to 10 ms).

Thus, the overall worst case latency of 12.5 ms is added, assuming DIP 400 is advertising a 10 ms poll interval. The latency in the video path from target device 300 to monitor 600 needs to be added to get the overall round trip mouse latency.

The number of video frames per second affects mouse performance. As described in accordance with FIG. 8, video engine 428 contains an algorithm to automatically adjust the frames per second if the latency between the DUS 500 and DIP 400 exceed a specific value. A monitor 600 connected directly to a target device 300 using 60 frames per second, means a frame is updated every 16.66 ms. There could be a worst case latency of 16.66 ms from the time a target device 300 updating the mouse on the video and the video being displayed on the monitor.

When the present system is added to the path the following add example latency to the target device 300 to monitor 300 path: latency in DIP 400 (<1 ms worst case), latency in network 100 (assuming 60 fps through network <0.5 ms worst case), latency in DUS 500 (<1 ms worst case), DIP 400 to target device video based on 60 Hz monitor display, (worst case<=16.66 ms). Thus, the overall worst case additional latency on target device 300 to DUS 500 path is approximately 19 ms assuming video at 60 fps.

An overall worst case round trip delay added by the present system is 31.5 ms. This is: peripheral 900 to target device 300 path (worst case 12.5 ms)+target device 300 to peripheral 900 path (worst case 19 ms).

An overall average round trip delay added by the present system is 18 ms. That is: peripheral 900 to target device 300 path (average 7 ms)+target device 300 to peripheral 900 path (average 11 ms). 18 ms is comparable to the mouse latency added by prior art products.

The DIP 400 will have reported a standard system keyboard and mouse report format and polling rate to the target device 300. Therefore, when an AVSP control channel is created between the DUS 500 and DIP 400, no transfer of descriptor information is required.

The keyboard and mouse flows will need to be translated to the USB format on the DUS 500, however hardware assist to be employed in the USB keyboard and Mouse flows through DIP 400 as for native USB peripherals.

Establishing the connection with the DUS 500 and DIP 400 can force the target device 300 to re-enumerate the USB port and will report the full set of descriptor information gleaned from the generic device on the DUS. This will cause the target device 300 to load the device specific driver and enable the device to operate. Such devices include joysticks, tablet based controllers, drawing tools, etc.

Figure 12:
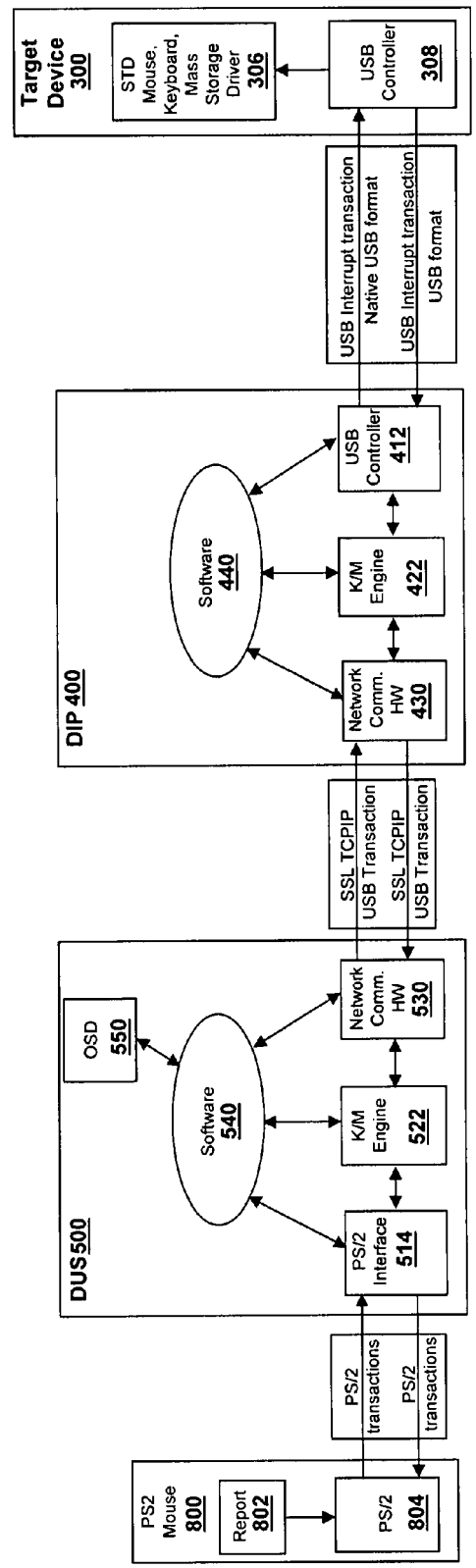
FIG. 12: an exemplary diagram illustrating components used with a PS/2 Keyboard and Mouse Connection media stream.

The exemplary system behavior with respect to PS/2 Keyboard and Mouse connection control and data flow is illustrated in FIG. 12.

Before establishing a PS/2 keyboard and mouse session the following conditions can be satisfied: DUS 500 and DIP 400 have been powered up, a PS/2 keyboard and mouse have been initialized by DUS 500, DUS 500 has established the AVSP control session with DIP 400, the network engines 434 and 534 have been enabled, and the keyboard and mouse session has been enabled on the session cert. The DUS 500 can configure the mouse report rate to a value that enables it time to process each key make and break code and translate to USB (i.e. every 20-25 ms or more).

The DUS 500 sends report descriptors to the DIP 400 over SSL/TCPIP using an extended AVSP command. The report describes the USB format into which the PS/2 keyboard/mouse data is translated to by the software 540.

The DIP 400 receives the report descriptor and forces re-enumeration on the composite keyboard and mouse USB port, reporting the new report descriptor to the target device 300 in the enumeration. This will ensure that the keyboard and mouse report formats can be interpreted by the target device 300. The DIP 400 having completed enumeration enables the keyboard and mouse data path. The DIP 400 will need to send the keyboard settings sent by the target device 300 to the DUS 500 so that the DUS 500 can initialize the keyboard LEDs, Cap Lock, Num Lock, etc. settings can be consistent with target device 300. The DUS 500 on receiving acknowledgement from the DIP 400 of enumeration completion enables its keyboard and mouse path. Keyboard and mouse data now flows between peripherals and the target device 300. Other than control of the session software 440 is not involved in keyboard and mouse report transfer.

Power is not removed from the peripheral when the DIP 400 forces the target device 300 to re-enumerate after a connection is established. This means that it is feasible to transfer device or report descriptors from the DUS and report to the target device 300 by the DIP 400 at the time of connection establishment. In the case of PS/2 this can be used to setup the DIP 400 correctly for PS/2 mouse report rate, report format.

PS USB HC must poll mouse and keyboard endpoints at an advertised rate. For example, 8 ms for mouse and 10 ms for keyboard may be advertised so as to never get buildup of packets. Alternatively a rate reported by the peripheral to the DUS 500 can be advertised, in this case every 25 ms. The keyboard/mouse USB port 308 (low/full) is re-enumerated using the report descriptors obtained from the DUS 500.

If a keyboard or mouse was inserted on the DUS 500 prior to the DUS-DIP connection being made, the PS/2 peripheral is initialized on insertion and the sequences as described are followed once the report descriptors are known to the DUS 500. Removal of a keyboard or mouse does not result in an interaction with the DIP 400, it simply sees no keyboard or mouse data. The DIP 400 only re-enumerates as described when a device is inserted.

Figure 13:
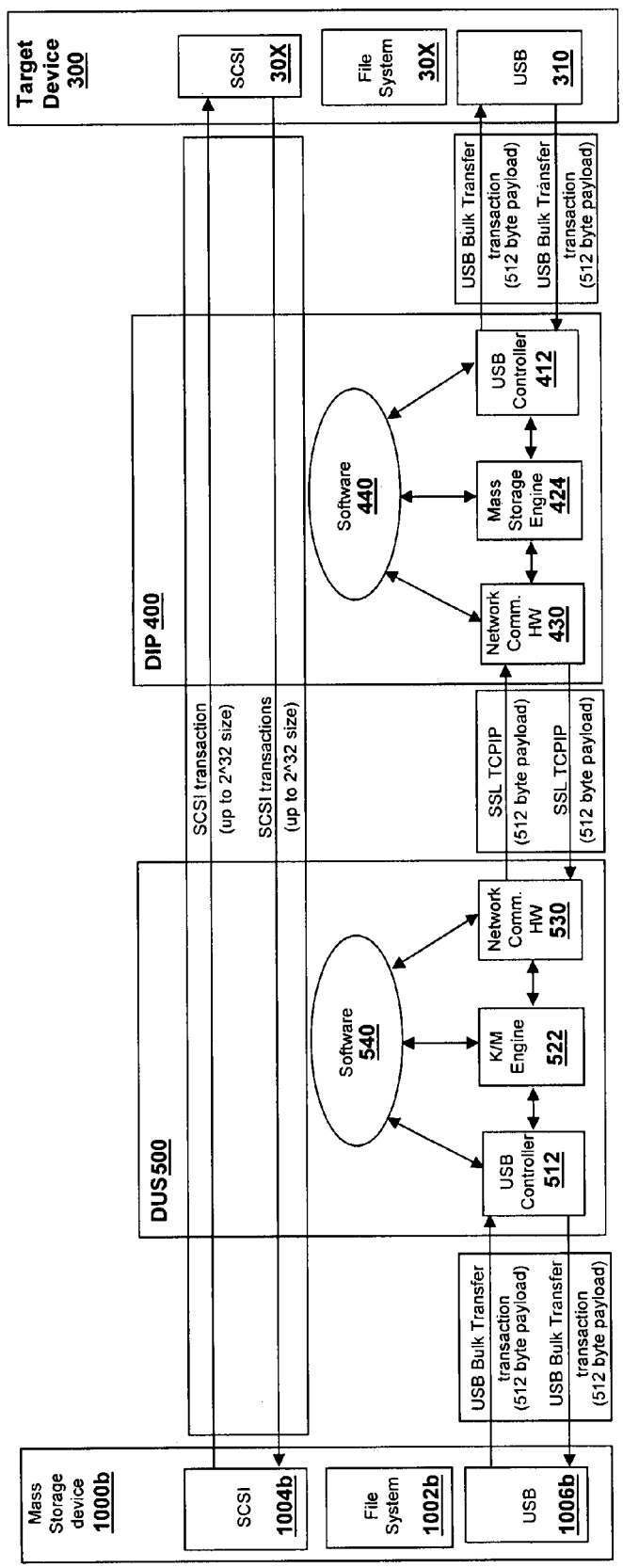
FIG. 13: an exemplary diagram illustrating components used with a mass storage media stream.

The exemplary system behavior with respect to Mass Storage (Virtual Media) connection control and data flow is illustrated in FIG. 13.

On power up the DIP 400 will have reported a standard Mass Storage bulk transfer only device to target device 300. However, when an AVSP control channel is created between the DUS 500 and DIP 400 on establishment of a DUS-DIP connection, the target device 300 SCSI requests can be transported across the system to/from the peripheral.

Similar to the Keyboard and Mouse connection establishment, the opportunity exists to modify the descriptor reported by the DIP 400 by obtaining the report descriptor from the DUS 500 and forcing the target device 300 to re-enumerate the full/high speed port.

The system transfers the SCSI transactions without copying or translating the transactions. The standard Mass Storage PC device driver will use a common set of SCSI commands that all Mass Storage compliant devices support. This level of support can handle all the required functionality provided by memory sticks, however with CD/DVDs special functions like drawer open and CD selection functions would not be available.

However, reporting the actual peripherals report descriptor will mean that the actual real device driver will be loaded on the PC and the full functionality of the driver could be utilized, provided the system can handle the SCSI command set. This should be possible provided the implementation can "transport" SCSI commands with interpreting them (other than to extract length and direction indicators).

Before establishing a USB mass storage session the following conditions should be satisfied: DUS 500 and DIP 400 have been powered up, a mass storage device 1000 has been enumerated by DUS 500, DUS 500 has established the AVSP control session with DIP 400, mass storage session has been enabled on the session cert. The implementation simply transports SCSI commands, and does not need to interpret or interact/spoof with the target device 300 driver.

The DUS 500 sends the device and interface descriptors for the enumerated mass storage device 1000 to the DIP 400 using an extended AVSP command. The DIP 400 receives the report descriptors and forces re-enumeration of the full/high speed port 310, reporting the new report descriptor to the target device 300 in the enumeration. The DIP 400 having completed enumeration enables the mass storage data path. The DUS 500 on receiving acknowledgement from the DIP 400 of enumeration completion enables its data path. Mass storage data now flows between peripherals and the target device 300. All data is transferred by hardware under software control. If no mass storage device was inserted on the DIP 400 prior to a DUS-DIP connection being made, the mass storage device 1000 is enumerated on insertion and the sequence described above is followed once the report descriptors are known to the DUS 500. Removal of a device results in the removal of the data path on the DIP 400. The DIP 400 only re-enumerates as described when a device is inserted, as it must keep a device there to guarantee maintenance of power.

Software 550 does not copy or translate data SCSI media transfer packets. Other than initial connection establishment, software is not involved in the data transfer. Other than initial connection establishment, software 450 is not involved in the SCSI packet transfer.

The DUS 500 will require software involved in each 512 byte block of the SCSI transaction to facilitate transfer from the host controller 512 to the network engine 534 and from the network engine 534 to the host controller 512, the data buffer shared by each side.

For the system to provide a good throughput 512 USB transactions of a SCSI transaction are to be grouped by hardware into a larger data block for each software interaction. The grouping should be such that software interactions are required not more than every 5 ms to 10 ms. 5 ms requires a shared buffer of 13.6 Kbytes for each side (HC, Network engine buffers are required to remain receiving at one side and transmitting at other side at the same time), i.e. 27.2 Kbytes {5/0.189=26.5 intervals (512 packets)=13.568 K transaction sizes required}. 8 ms requires a shared buffer of 21.5 Kbytes for each side (HC, Network engine), i.e. 43 Kbytes {8/0.189=42 intervals (512 packets)=21.504 K transaction sizes required}.

The buffering, as described, assumes a single mass storage device, adding another mass storage device will require twice the buffer space to maintain a similar throughput.

In this scheme the DIP 400 is not aware or SCSI level transactions. It is simply transferring data blocks from USB to network 100 and from network 100 to USB. The DUS 500 needs to have minimal awareness of the SCSI transactions. It needs to know the SCSI request type (CMD, Data, Status), its length, and if its an IN or OUT request so it can manage the HC USB scheduling correctly. The memory HC and network engine FPGA should be dual port shared memory.

The transfer of media between a DIP 400 and DUS 500 can occur within any of the following three modes of operation: extender, desktop and matrix. Regardless of the mode of operation, the DIP 400 is a slave device and has no awareness of the configuration it is operating in.

FIGS. 14-18 illustrate the extender configuration. In the extender configuration a single DUS 500 and DIP 400 are present and a DUS 500 connects to a specific DIP 400 based on a direct physical connection—no login is required. The DUS 500 and DIP 400 establish media sessions between one another without the use of a trusted third party. Thus, a central authentication, authorization and administration engine, i.e. MgmtApp 200, is not required in the extender configuration. Extender mode does not have the concept of users. In a point-to-point extender configuration all administration and configuration shall be achieved through the DUS OSD 550 or serial interface 560. The OSD 550 on the DUS 500 shall enable user and administrator level configuration. The serial interface on the DUS 500 shall provide commissioning, general administration and debug capabilities.

Figure 14:
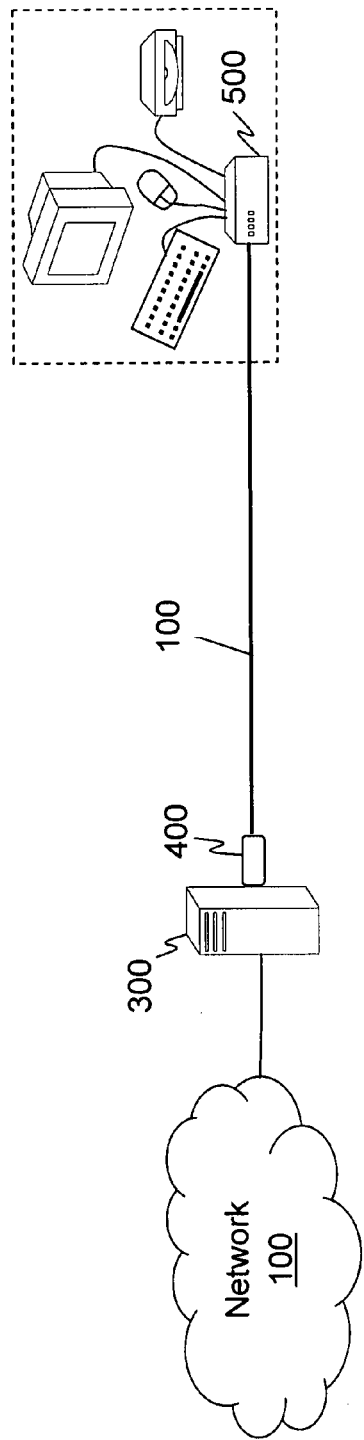
FIG. 14: an exemplary diagram illustrating physical extender configuration.
Figure 15:
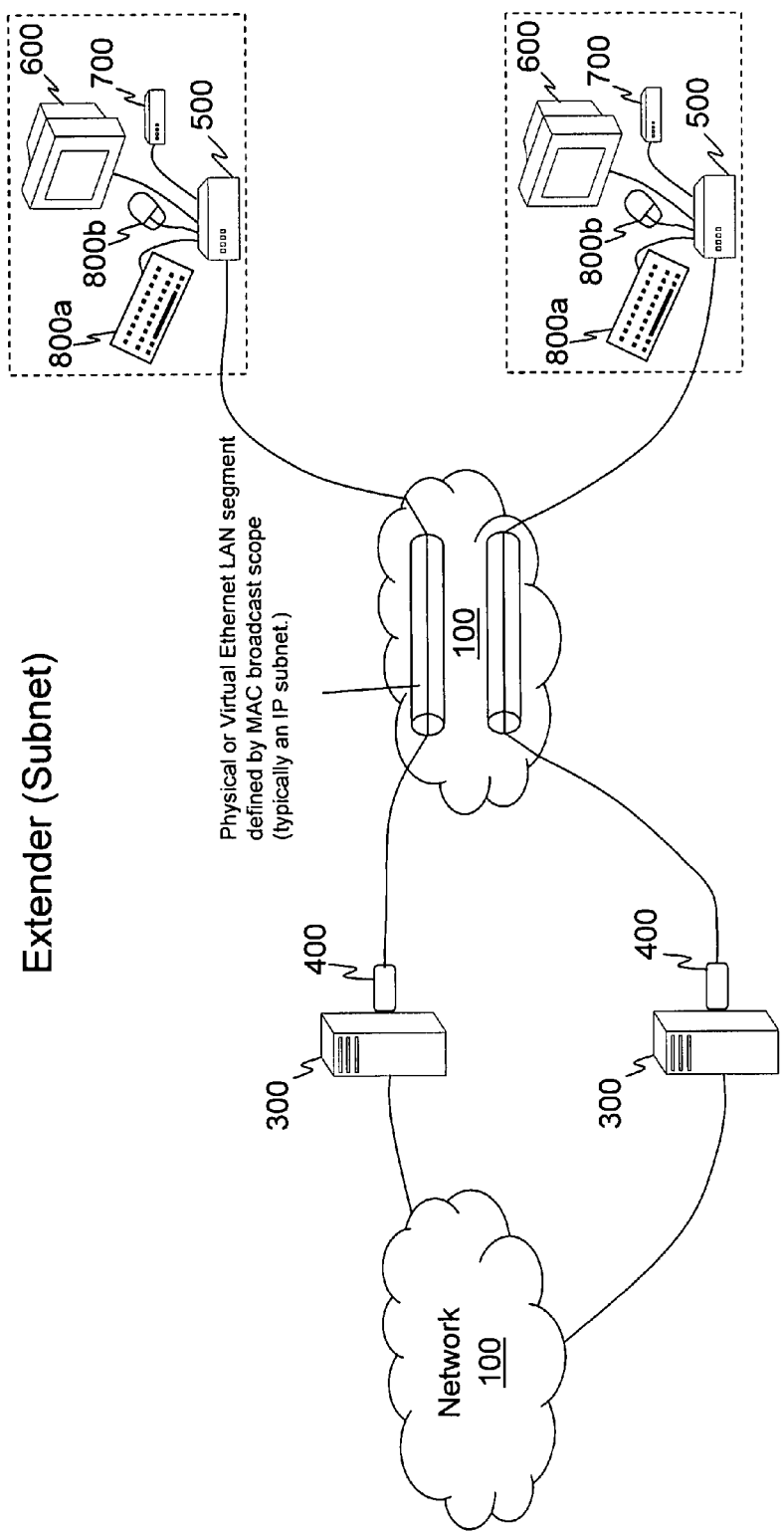
FIG. 15: an exemplary diagram illustrating subnet extender configuration.

The extender configuration is employed when a DUS 500 and DIP 400 are connected directly using a single cable, as shown in FIG. 14, or when the DUS 500 and DIP 400 are connected via a physical or virtual Ethernet LAN segment defined by MAC broadcast scope (e.g. an IP subnet), as shown in FIG. 15.

Once powered on, a DUS 500 automatically connects to a partner DIP 400, where partner DIP 400 is a single DIP 400 directly connected to DUS 500 or a single DIP 400 on the IP subnet of the DUS 500. DUS 500-DIP 400 connections are over SSL authenticated connections. When used in a direct cable configuration the DUS 500-DIP 400 association is defined and protected by the physical wire connection.

When used on a physical subnet, the implementation utilizes broadcast auto-discovery. The DUS 500 will only connect and remain connected to a DIP 400 provided one DUS 500 and one DIP 400 are present on the subnet. Otherwise, a DUS 500 will not connect to a DIP 400 (it enters desktop mode). If the implementation does not utilize auto-discovery, the DUS 500 will only connect to a DIP 400 configured with the same IP address to which the DUS 500 is configured to connect to. The DUS 500 can be configured to connect to any DIP 400 IP address. This IP address can be changed via the DUS 500 serial port.

Minimal administration is required in extender mode. The appliances will operate "straight-out-of-the-box." That is, the administrator simply needs to install a DUS 500 and DIP 400 with default settings in an extender configuration as illustrated in FIGS. 14 and 15. If the appliances do not have default settings the settings can be reset via the DUS 500 serial port 560.

An administrator installs the appliances by connecting peripherals to the DUS 500, connecting DUS 500 to an Ethernet 10/100/1000 cable, connecting DIP 400 to the cable, connecting DIP 400 to target device 300, powering on the target device 300 which powers up the DIP 400 via USB ports, and powering up the DUS 500.

Once the DIP 400 is powered on, it initializes itself by using its factory default IP addressing mechanism (e.g. DHCP) to search for an IP address. In extender mode no DHCP server is available. Once a DUS 500 is powered on, it displays an initialization screen and initializes itself using its static IP address data.

Figure 16:
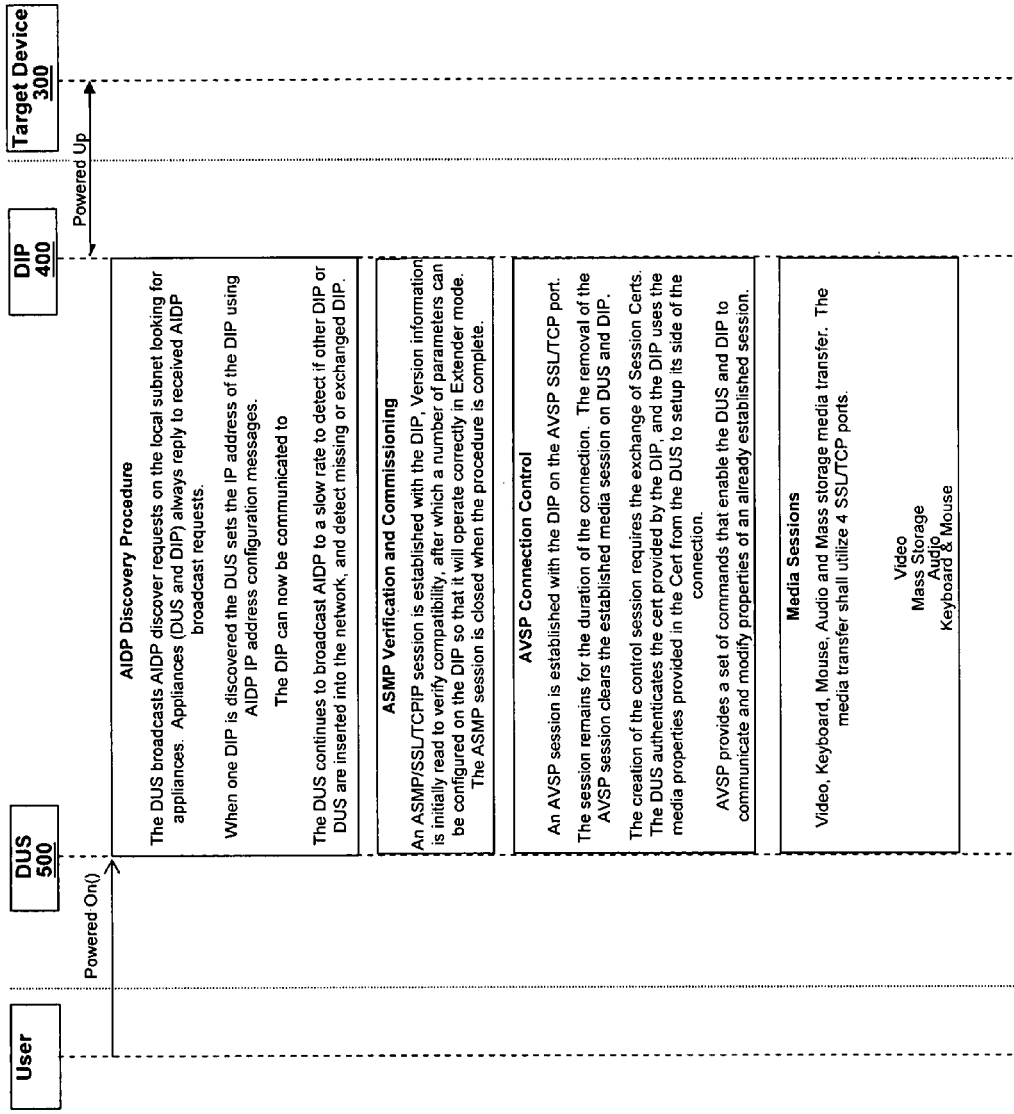
FIG. 16: an exemplary diagram illustrating power up of DUS in extender configuration.

Once DUS 500 and DIP 400 are installed, the DUS 500 begins the process of establishing a connection with the DIP 400. This process is illustrated in FIG. 16. In the exemplary embodiment, the DUS 500 and DIP 400 utilize AIDP (Avocent Install Discovery Protocol) broadcast discovery. An IP configuration protocol (e.g., ASMP (Avocent Secure Management Protocol)) is used by the DUS 500 to obtain DIP 400 information. The DUS 500 looks for a partner DIP 400 by broadcasting AIDP discovery packets. The DUS 500 will remain searching until it finds a DIP 400 or DUS 500, sending a broadcast every second. When an initialized DIP 400 receives an AIDP discovery protocol request it responds by identifying itself. This allows the DUS 500 to know of its existence. When a single DIP 400 is detected, the DUS 500 uses the AIDP protocol to program it with the IP address it has for the DIP 400 and continues to search for other DUSs and DIPs but at a slower rate (e.g. every 10 seconds). The DIP 400 stores the IP data persistently and configures itself to use static IP addressing. When DIP 400 is inserted into a network 100 it stays quiet and only responds to requests. The exception being SNMP traps if they are enabled. In this case, the DIP 400 will send an SNMP trap on startup to the configured destination address.

Once a single DIP 400 is detected and programmed with an IP address, the DUS 500 verifies that the DIP 400 is compatible and configures the DIP 400 by establishing an ASMP session with the DIP 400. The persistent session certs on the DUS 500 and DIP 400 are used to authenticate an ASMP SSL session. The DIP 400 receives and responds to ASMP requests for version and other information from DUS 500. The DUS 500 will obtain the DIP 400 revision information using the ASMP protocol and verify it is compatible. The DUS 500 may choose to configure specific parameters on the DIP 400 using ASMP. The DIP 400 may receive and respond to ASMP requests to configure data. Once the configuration procedure is complete, the DUS 500 closes the ASMP session with the DIP 400 and establishes an AVSP control SSL connection with the DIP 400 using the AVSP protocol as described in accordance with FIG. 6.

The DUS 500 activates AVSP keep alive transmission/reply checking on the session control connection between DUS 500 and DIP 400. The DUS 500 configures and enables its media sessions as indicated in the session cert. The DIP 400 configures and activates its media streams on detection of an AVSP keep alive response from the DIP. 400. The DIP 400 responds to requests to establish an AVSP session control SSL connection, exchanging the session cert maintained persistently on the DIP 400. When the DIP 400 receives an AVSP keep alive on the session control connection, it configures its media sessions as indicated in the session cert received from the DUS 500 (the DUS 500 will enable its media streams on reception of the keep alive response). The DUS 500 sends a keep alive response to the DUS 500. The DUS 500 user is now connected to the target device 300.

If more than one DIP 400 or another DUS 500 is detected at anytime the DUS 500 resets open associations it has and enters desktop mode. Until the DUS 500 has been explicitly provisioned to be in desktop mode, it will always attempt to start in extender mode on power cycle.

If the AIDP discovery procedure after finding a DIP 400, misses three consecutive discovery replies from the DIP 400 it assumes the DIP 400 is missing and enters the fast discovery mode to either detect the DIP 400 returning or detect a new DIP 400 having been inserted. If AIDP discovery procedure having found a DIP 400, finds a subsequent discovery response indicates a DIP 400 with a different MAC address (i.e. DIP 400 has been switched), the discovery procedure initiates reset of all open associations the DUS 500 and restarts this procedure at the point when a single DIP 400 is discovered. An implementation may choose not to use the AIDP discovery protocol. An implementation may choose not to use ASMP for retrieval of DIP 400 information by the DUS 500. Extensions to AVSP can be used to retrieve the required information on connection establishment.

Figure 17:
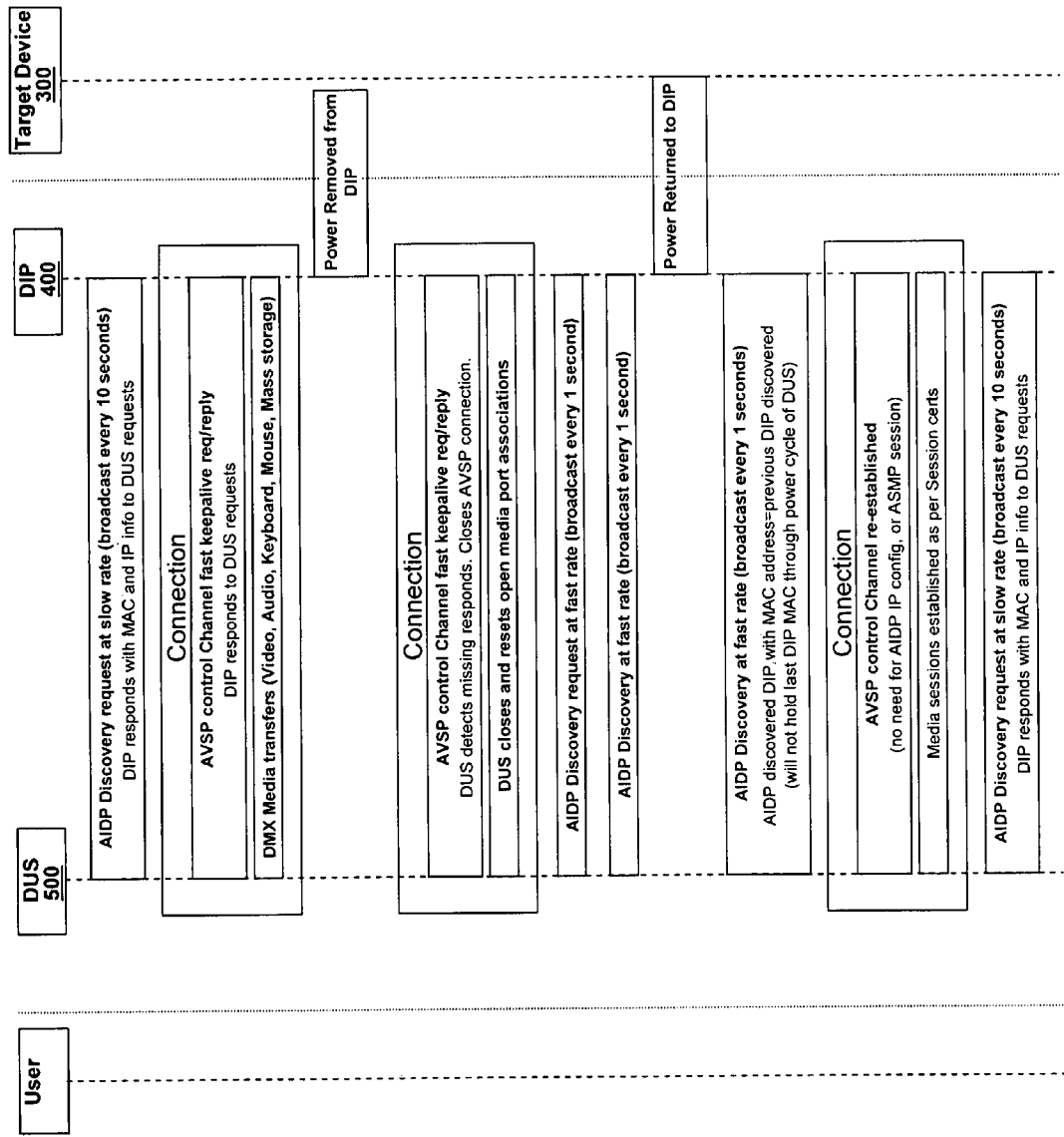
FIG. 17: an exemplary diagram illustrating power down of DIP in extender configuration.

FIG. 17 illustrates the architectural behavior and broad protocol usage for a DUS 500 and a DIP 400 in an extender mode configuration. When a connection is established, the DUS 500 needs to be able to accommodate the possibility of a target device 300 being reset or the DIP 400 being replaced. When this occurs, the connection needs to be re-established rapidly.

The DUS 500 shall complete the powerup sequence within 20 seconds, including any self test diagnostics it may run. The DUS 500 shall during powerup keep the DUS 500 user informed of its activities via an OSD message display on monitor 600. The DUS 500 and DIP 400 each shall have a persistently stored session cert (factory default shipped with product) for use in extender mode. The certs are used in SSL link establishment. DUS 500 session cert shall have media session property extensions that are used to determine the media session and session properties to connect. At power up DUS 500 always responds to AIDP discovery requests irrespective of operating mode.

When the target device 300 is powered down, resulting in abrupt power down of the DIP 400. The DUS 500 stops receiving AVSP keep alive replies (every 500 ms). After missing three consecutive replies the DUS 500 declares the connection with the DIP 400 broken. The DUS 500 resets its open SSL/TCPIP associations with the DIP 400 (media streams and AVSP control session), and displays a message indicating that the connection is broken with the DIP 400. The DUS 500 places the AIDP discovery procedure into fast detection mode (1 second interval instead of 10 seconds). When the DUS 500 AIDP procedure detects a DIP 400 again, it indicates if it is the same DIP 400 that was lost (based on MAC address). If the same DIP 400 is discovered the DUS 500 follows the DUS 500 powerup usecase sequence after the point where the ASMP session is closed. That is, the DUS 500 re-establishes the AVSP control session with the DIP 400 and the media session are re-established.

If AIDP discovery procedure having found a DIP 400, finds that a subsequent discovery response indicates a DIP 400 with a different MAC address (i.e. DIP 400 has been switched), the discovery procedure initiates reset of all open associations with the DUS 500 (as in the case they may already be reset if another application detects problems communicating with a DIP 400 more quickly) and restarts at the DUS 500 at the point after a single DIP 400 is discovered for the first time. The implementation may choose not to use the AIDP auto discovery and IP configuration protocol.

On restart of the target device 300 and the subsequent DIP 400 powerup the time it takes to establish a connection on the DUS 500 and DIP 400 again needs to be fast enough to be able to have a DUS 500 user access the target device bios. This concern is mitigated by the fact that if the same DIP 400 is re-discovered (having been lost) the connection re-establishment is immediate.

When a connection is established, it is possible that the DUS 500 is powered down. On power down of a DUS 500 a connection present is effectively removed totally and must be re-established in full. The DIP 400 on detecting loss of a connection with a DUS 500, clears any open associations with the DUS 500 and readies itself for another connection attempt. This process is as follows:

The target DUS 500 is powered down, resulting in abrupt power down of the DUS 500. The DIP 400 stops receiving AVSP keep alive requests (every 500 ms). After missing three consecutive requests the DIP 400 declares the connection with the DUS 500 broken. The DIP 400 resets its open SSL/TCPIP associations with the DUS 500 (media streams and AVSP control session). The DIP 400 is now ready to accept another AVSP control session establishment request (re-establish the connection again). An implementation may choose not to use ASMP between DUS 500 and DIP 400 instead using an AVSP extension to retrieve data from the DIP 400.

Once a connection is established a cable fault breaking communication in both directions is also possible. A network or cable fault will result in the DUS 500 missing keep alive responses and the DIP 400 missing keep alive requests. The DUS 500 behaves as indicated when the DIP 400 is powered down. The DIP 400 behaves as indicated when the DUS 500 is powered down. On resumption of the network/cable connectivity, the DUS 500 will re-discover the DIP 400 within one second (the fast discovery interval). The AIDP discovery procedure recognizes that it's the same DIP 400 (MAC address returned in discovery response) and re-establishes the AVSP control connection and associated media sessions with the DIP 400.

A network/cable fault that breaks communication in the DUS 500 to DIP 400 direction will cause the DIP 400 to behave as indicated in when the DUS 500 is powered down. A network/cable fault that breaks communications in the DIP 400 to DUS 500 direction will cause the DUS 500 to behave as indicated when the DIP 400 is powered down.

Another aspect of the extender configuration is the capabilities of a DUS 500 with respect to items presented on the OSD (on-screen display) 550. All items presented on the OSD 550 are assumed to be modifiable by the DUS 500. Administration items are carried out through the password protected serial port 560. The DUS 500 user hits the OSD 550 hotkey sequence, after which the OSD 550 is displayed and all keyboard and mouse transactions are directed to the OSD 550. The user can navigate the OSD 550 as required. When a connection is made, OSD 550 shall, as well as providing the capability to view and perform actions locally on the DUS 500, provide the ability to view and perform actions that require data retrieval or modification on the DIP 400. The ASMP protocol is used to view version and addressing data on the DIP 400. The AVSP protocol is used to modify the characteristics of the media sessions. Implementations may choose not to use ASMP, instead using an extension to AVSP.

When the serial interface 560 is password protected, the administrator inserts a password and is presented with a serial menu from which configuration can be achieved. Menu options include setting IP address, download of image file via xmodem, firmware upgrade of DUS 500, firmware upgrade of DIP 400, etc. Hidden menu options will exist for manufacturing development and tech support debugging purposes.

Figure 18:
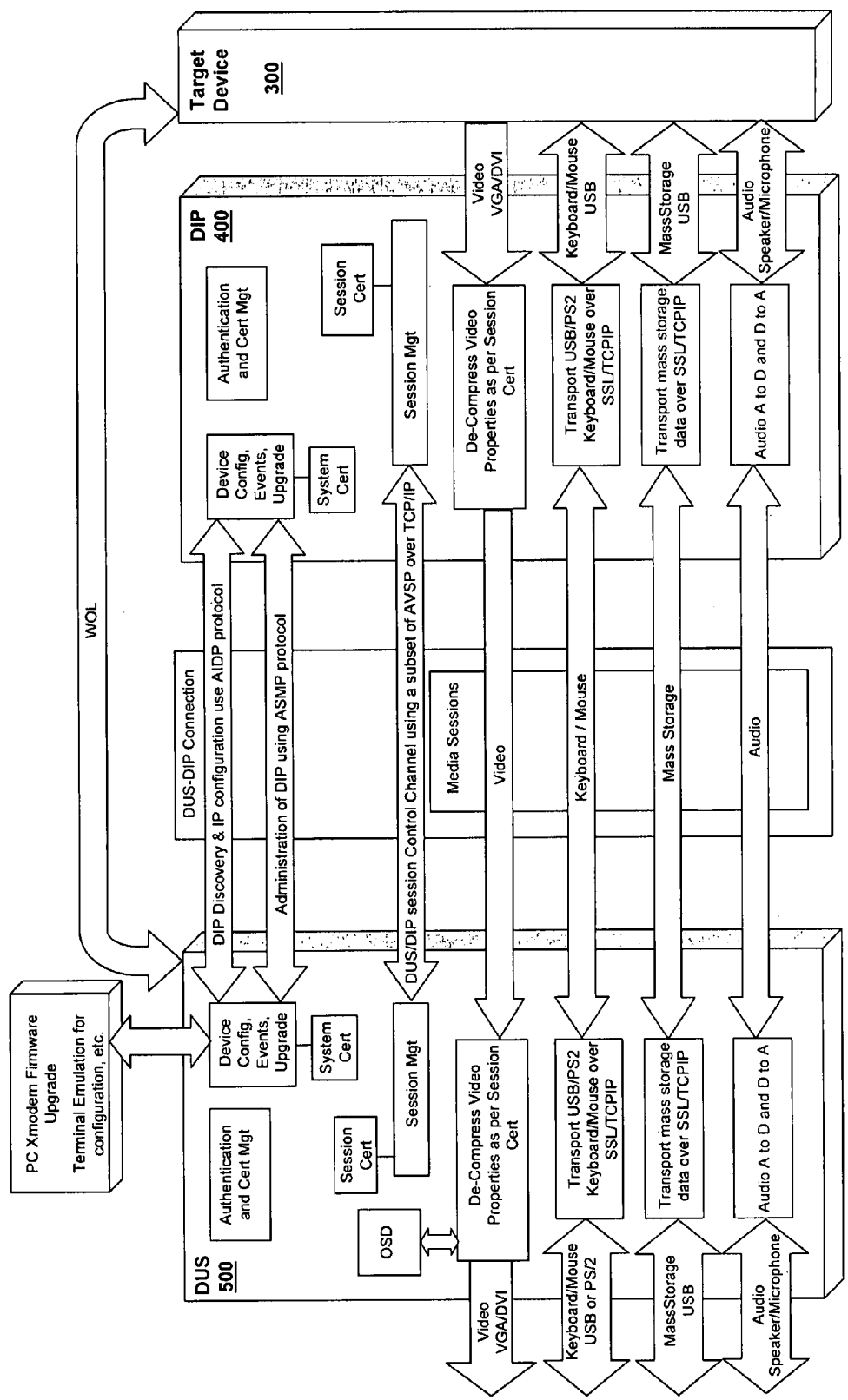
FIG. 18: an exemplary functional model of extender configuration.

FIG. 18 is an exemplary functional model of extender configuration. FIG. 18 summarizes operation of DUS 500 and DIP 400 in extender mode as previously described. As shown in FIG. 18 for the exemplary embodiment, DUS 500 discovers DIP 400 using AIDP, DUS 500 administers a DIP 400 using ASMP, DUS 500 and DIP 400 establish a control channel using AVSP, and media sessions are created. Further, as shown in FIG. 18 DUS 500 can use WOL (wake on LAN) to power on a target device 300 when an appropriate network connection is established. This process is described in greater detail in accordance with the desktop/matrix configuration.

FIGS. 19-25 illustrate the desktop/matrix configuration.

Figure 19:
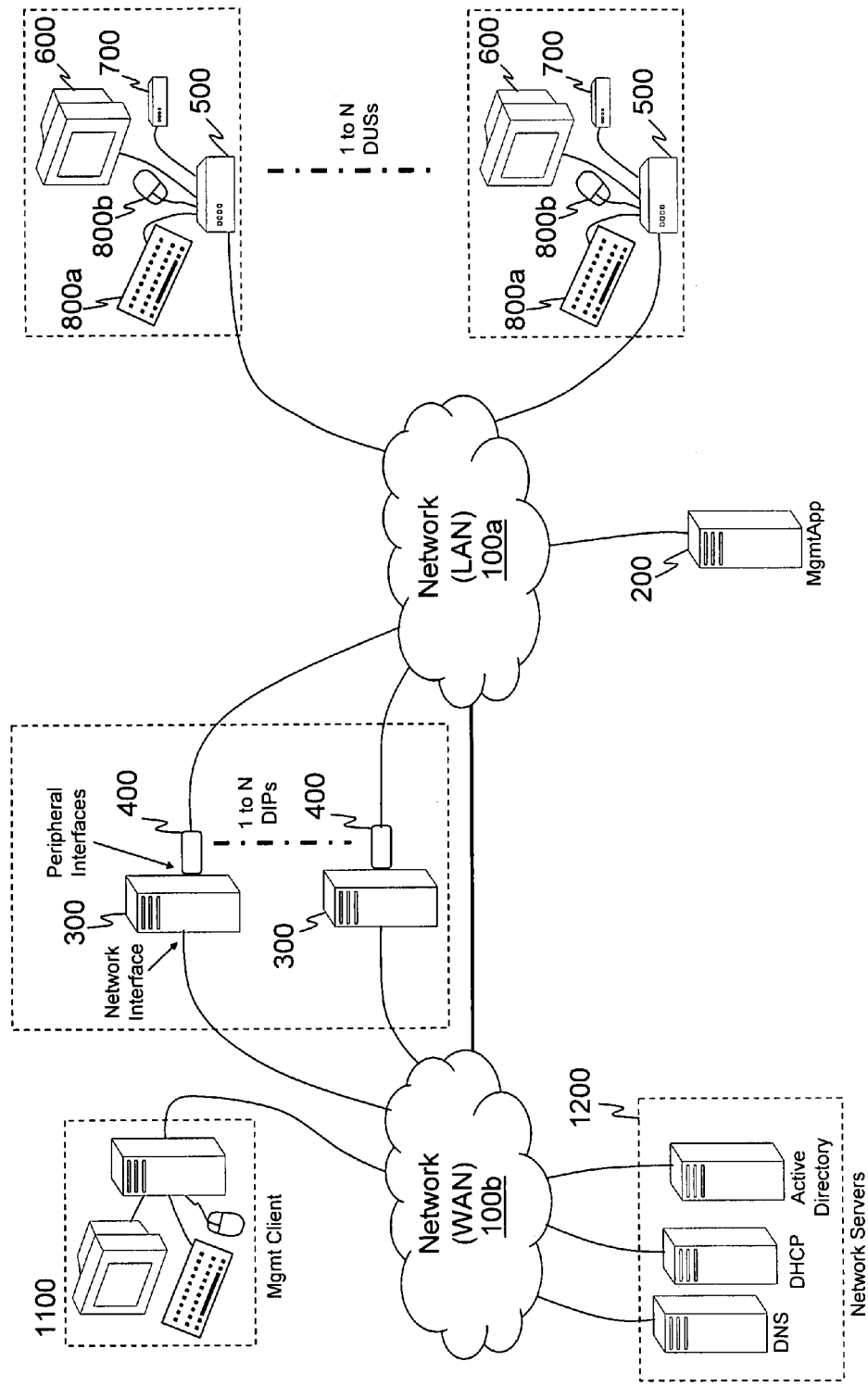
FIG. 19: an exemplary diagram illustrating desktop and matrix configuration.

FIG. 19 illustrates an exemplary desktop/matrix configuration. As shown in FIG. 19, any number of DUSs 500 and any number of DIPs 400 are connected to a local area network 100*a*. As such, a particular DUS 500 and DIP 400 establish media sessions between one another with the use of a trusted third party, the Management Application (MgmtApp) 200 connected to local area network 100*a*. Further, target devices 300 and local area network 100*a* are connected a wide area network 100*b*. A management client 1100 and network 1200 are also connected to wide area network 100*b*.

Desktop and matrix modes both involve a user logging into a DUS 500 and connecting to a DIP 400. The difference between the two modes is that in desktop mode the user will automatically be connected to a predetermined DIP 400. Matrix mode is similar to desktop mode except that when a user logins to the DUS 500, a user obtains a list of target devices 300 (or DIPs 400). The user then selects a target device 300 and a specific connection is established. Login and Auto login modes are available in both modes.

The MgmtApp 200 provides the following functions: administration, authentication, and authorization. The core MgmtApp 200 administration functions include the ability to: administer a database of target device users, system administrators, and administer appliances (e.g. DUSs 500 and DIPs 400). The MgmtApp 200 can configure appliances by: upgrading/downgrading appliance firmware versions, configuring appliance addressing information, configuring the login mode used by the DUSs 500 (i.e. Login or Auto login). MgmtApp 200 can also administer user access session data. This includes the DUSs a specific user is allowed to login from, the operating mode to be used when accessing from a specific DUS (e.g. desktop or matrix), the media sessions allowed for a specific user (e.g. video, vMedia, keyboard/mouse, or audio). Further, an administrator can use MgmtApp. 200 to enable and disable media sessions on a per user basis. An administrator can set the maximum media session properties allowed for a specific user. An administrator can set the maximum quality and performance experience required by a user. This provides a mechanism to manage the network bandwidth utilized by users. The following are configurable by an administrator to manage network bandwidth: video properties (e.g. frames per second and color depth), vMedia properties (the ratio of bandwidth usage between the high bandwidth users video and vMedia) and audio properties (e.g. The jitter/playback buffer size). The ratio of bandwidth usage setting effectively guarantees a specific minimum percentage of the bandwidth for Video. The jitter/playback buffer size is a characteristic of network latency rather than bandwidth.

The MgmtApp 200 provides authentication of: administrators access to the MgmtApp 200 through a web browser (i.e. Mgmt Client 1100 access) and target device user access to a DUS 500. Target device user access to a DUS 500 authentication includes: Internal Authentication (MgmtApp 200 authenticates users/passwords) and External Authentication through the use of a third party authentication servers (LDAP, Active Directory, etc).

The MgmtApp 200 authorization functions include: authorizing system administrators and DUS-Target PC user system access rights, and media sessions definition and connectivity.

The general system level principles of desktop/matrix configurations are described by describing the following use-cases: (1) Installation/Administration which includes: Appliance Installation/Administration (described in accordance with FIG. 20), target device administration (described in accordance with FIG. 21), and user administration, (2) Power-up of installed DUS and DIP (described in accordance with FIGS. 23 and 24, respectively) (3) Connection Establishment and Removal (FIG. 22), (4) Power-down of installed DUS and DIP, and (5) Cable or network fault.

Figure 20:
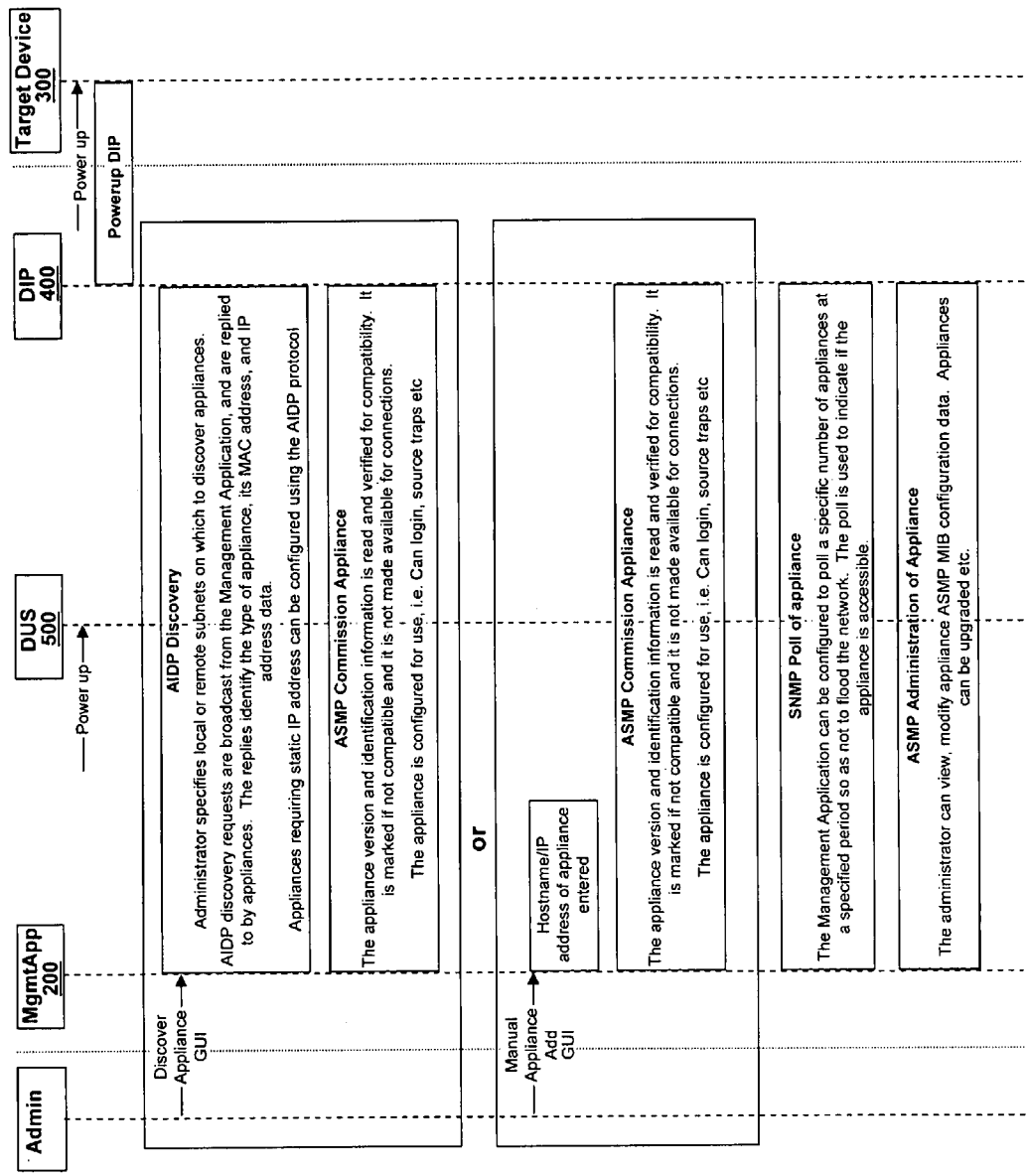
FIG. 20: an exemplary diagram illustrating the initial installation/commission and administration of appliances in desktop/matrix configuration.

The initial installation and commissioning of appliances to bring the system to a state ready to establish media sessions between a DUS 500 and DIP 400 is described in accordance with FIG. 20.

For the initial installation it is assumed that DUSs 500 and DIPs 400 have default factory settings and DUSs 500 by default have login enabled and are connected according to FIG. 19. It is also assumed that explorer software that includes MgmtApp 200 is installed on a dedicated server. The MgmtApp 200 is used to setup a standard configuration that needs to be performed on each newly discovered appliance (set SNMP trap address, set management IP address, etc.).

The MgmtApp 200 discovers DIPs 400 and DUSs 500 on the network 100 using one or more of the following methods: automatically using AIDP broadcasts to the local subnet, automatically using directed AIDP broadcasts to specified remote subnets, or manually by entering the specific a DIP 400 or DUS 500 hostname or IP address. If static IP addressing is required, MgmtApp 200 is used to configure static IP address data on discovered DIPs 400 and DUSs 500. The AIDP protocol is used to achieve this.

The MgmtApp 200 establishes an ASMP session with each of the discovered DIPs 400 and DUSs 500 to "commission" the devices and add them to its database. MgmtApp 200 verifies that the DIPs 400, DUSs 500, and explorer software versions are compatible (flagging incompatible appliances) and auto configures DIPs 400 and DUSs 500, if auto configuration items are setup. The MgmtApp 200 closes the ASMP session with the DIPs 400 and DUSs 500 on completion of "commissioning."

The MgmtApp 200 polls DIPs 400 and DUSs 500 in its database to determine availability (SNMP/UDP poll of MIB variable). The MgmtApp 200 listens for SNMP traps to augment its polling of DIPs 400 and DUSs 500 to determine availability. The DIPs 400 and DUSs 500 can now be configured, administered, and upgraded using ASMP. The appliances are ready for connections to be established.

DUSs 500 can alternatively be locally configured via their serial ports 560 to be in desktop mode. DUS 500 appliances can be configured for autologin access. When a DUS 500 is configured for autologin, the MgmtApp 200 adds the DUS 500 specific "autologin" user to its database. The user is administered on the MgmtApp 200 just like other users. The DUS 500 resets itself on setting to autologin mode, and continually attempts to login on power up.

The DUS 500 and DIP 400 hostnames can be modified via the ASMP MIB interface. The factory default host names are "DUS xxxxxx" and "DIP xxxxxx," where xxxxxx is the appliance MAC address. The default IP addressing mechanism used by the DUS 500 in Desktop/Matrix mode is DHCP, unless configured to operate using static IP addressing. The default access mode of a DUS 500 is login. A DUS 500 login access mode (login/auto login) can only be configured via its ASMP interface. The username and password to be used in autologin mode can be configured on the DUS 500 via its ASMP interface only.

After DIPs 400 and DUSs 500 have been installed and commissioned as described in accordance with FIG. 20, the MgmtApp 200 must associate each DIP 400 with a target device 300. Target devices 300 are the primary reference used by administrators. At a user interface level the DUS 500 user is associated with one or more target devices 300. Target device 300 host names can be automatically or manually associated with DIPs 400 by the administrator. To automatically associate a DIP 400 and target device 300, the MgmtApp 200 can automatically discover target devices 300 that have DIPs 400 attached and by using a unique identifier of the DIP 400 and target device 300 (MAC addresses) and auto associated the two. The auto association procedure can be run on installation and run at defined intervals subsequently. The administration of the target device 300 is described in accordance with FIG. 21.

It should be noted that it is assumed that auto discovery using WMI will detect target devices 300 using a Microsoft Windows OS. On starting the target device 300 discovery GUI, the administrator tells the GUI where and how to discover target devices 300 by entering: the subnets to search and the Microsoft Domain to search. For each subnet specified, MgmtApp 200 polls each IP address using WMI query to detect target devices 300. For each Microsoft Domain specified, MgmtApp 200 queries the Domain controller for the list of target devices 300. The MgmtApp 200 searches for target devices 300 and queries target devices 300 using WMI for the following matches: a USB device with an appropriate Vendor ID is attached and for devices with an appropriate Vendor ID, a device ID that identifies it as a DIP 400. Target devices 300 with DIPs 400 attached, have the following information retrieved and stored in the target device list on the Mgt. App. 200: PC hostname and MAC address, PC MAC address (required for remote wakeup), PC OS type (can be used for auto logout marco selection etc.), and DIP MAC address. The MgmtApp 200 looks up the DIPs in its database and matches it with the MAC address reported from the target device 300. The DIP 400 is then automatically associated with the target device 300 and stored in the MgmtApp 200 database. The OS type can be used to select the login and logout macros and have them provisioned on the DIP 400 using ASMP. The MgmtApp can at a preconfigured time or specified intervals repeat the auto discovery procedure to maintain an updated view of target device 300 and DIP 400 associations. Changes in the DIP-Target device associations are flagged to the administrator.

Figure 21:
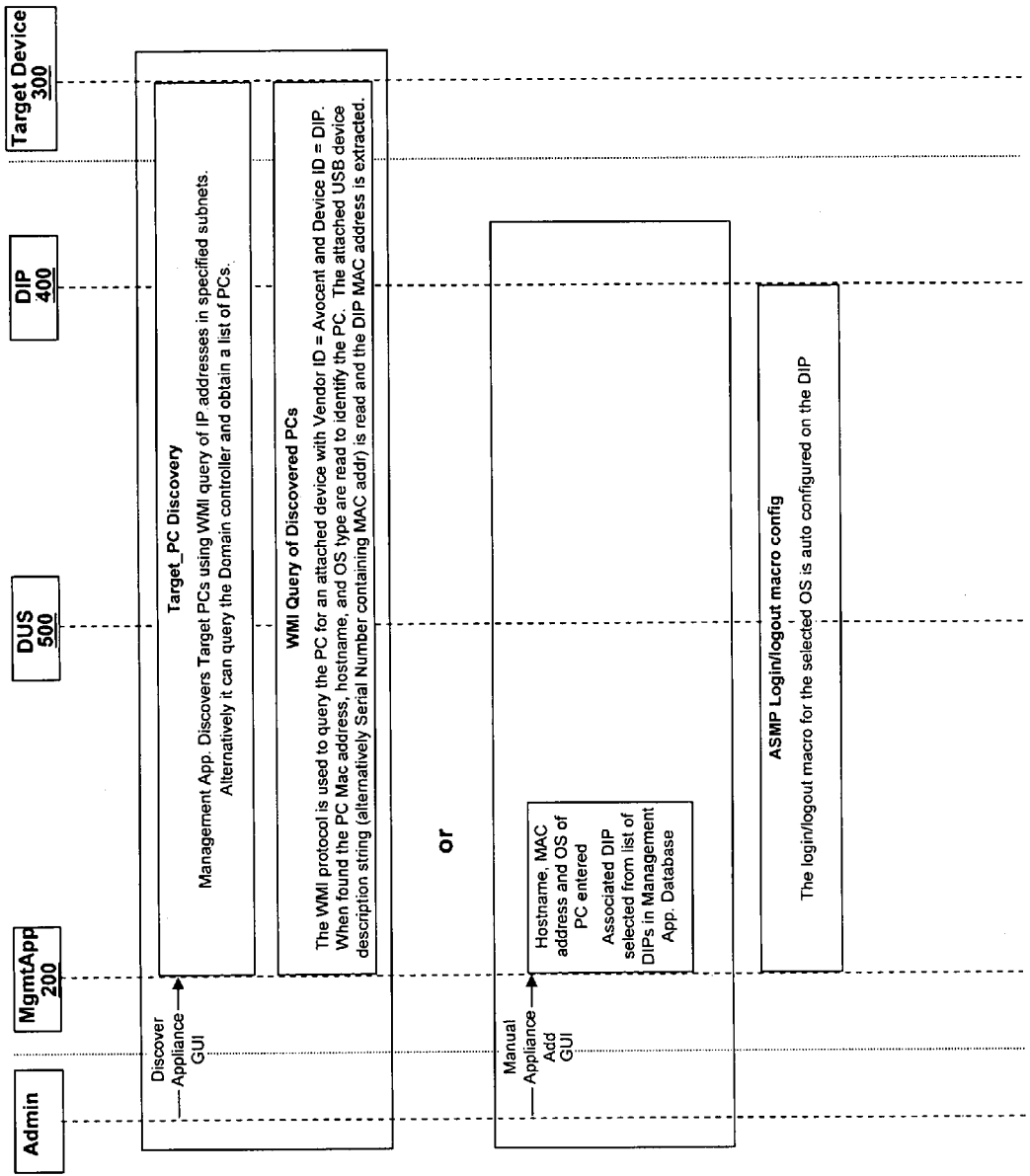
FIG. 21: an exemplary diagram illustrating administration of a target device in desktop/matrix configuration.

FIG. 21 also shows that the administrator can manually associate a DIP 400 with a target device 300 by using the manual target device add GUI. This takes place entirely on the MgmtApp 200. The administrator enters the target device host name, and selects the DIP 400 from the list of DIPs in MgmtApp 200 database.

Once target device administration occurs, user administration can occur. For user administration in the exemplary embodiment the database of users and their associated configuration data is maintained in MgmtApp 200 database and DUS 500 and DIP 400 do not store user information. Further, the following description describes a user is being configured for internal authentication in desktop mode.

The first step of user configuration is the administrator configuring the password policy. This includes configuring: required password fields (numeric, capital, etc), minimum password length, and password expiry. The administrator then creates a user account. The administrator then configures the user as being internally authenticated. The administrator configures the following connection associated information: DUSs 500 from which the user is allowed to login from, the mode used when logging in from specific DUS 500 is set as desktop. The desktop mode data is configured for the user. Desktop mode data includes: a primary target device selected from list of known target devices, and secondary target device selected from list of known target devices. After the administrator completes these steps, a user is ready to participate in connections.

It should be noted that in alternative embodiments a user can be configured as using an external authentication service.

It should be noted that although FIG. 21 describes configuration for desktop mode matrix mode can also be configured. Further, in the exemplary embodiment the database can contain up to 200 user accounts.

Figure 22:
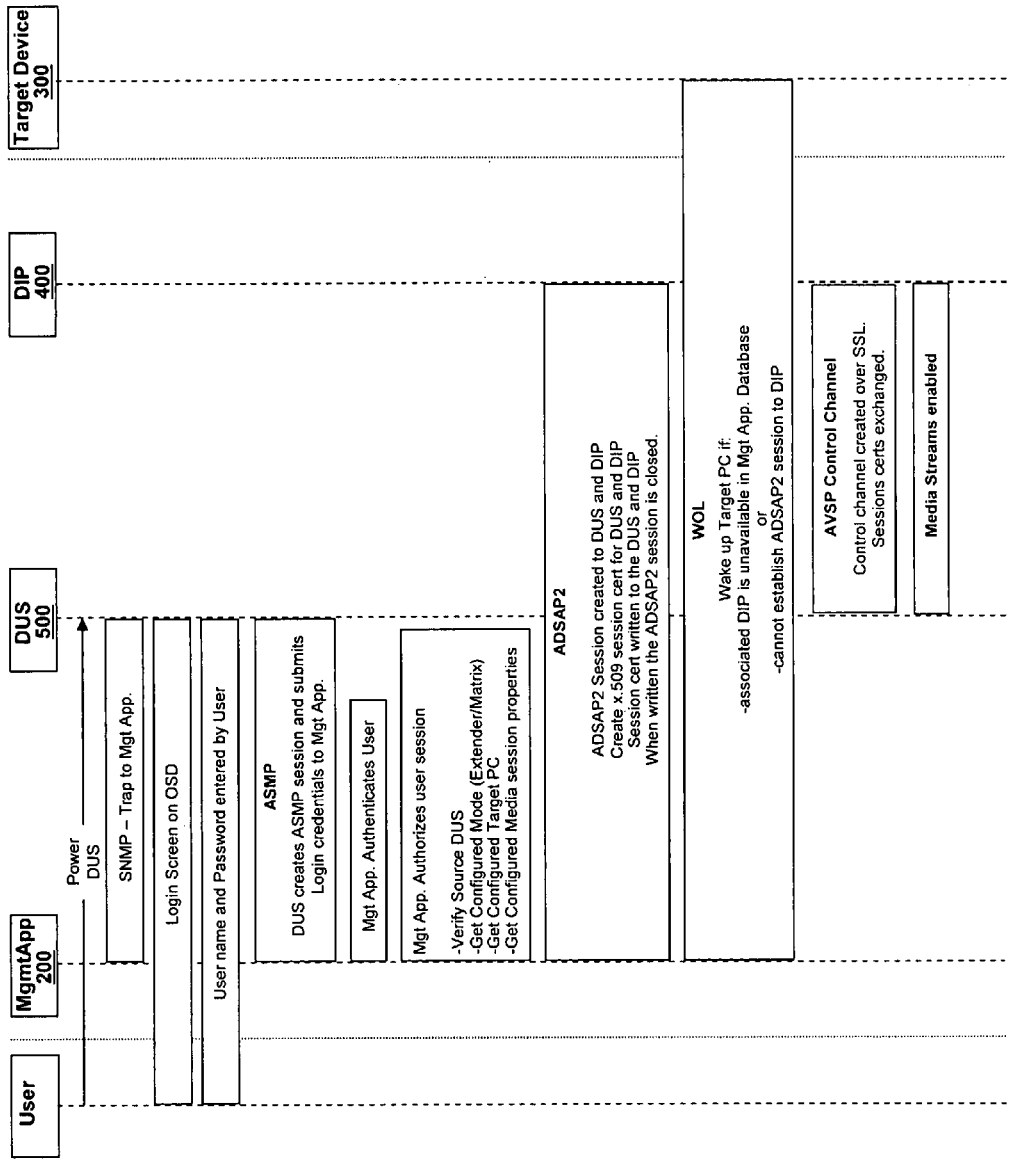
FIG. 22: an exemplary diagram illustrating login and connection establishment in desktop/matrix configuration.

The desktop mode login and associated connection is described in accordance with FIG. 22.

Prior to login it is assumed that necessary Installation/Administration steps have occurred. In addition the following description assumes that DUS 500 is powered down and DUS 500 used DHCP. As shown in FIG. 22, the DUS 500 user powers up the DUS 500. The DUS 500 displays an initializing OSD message or message sequence to inform the user of powerup progress. The DUS 500 configures its IP address using DHCP. The DUS 500 can now respond to the MgmtApp 200 SNMP polls (to determine availability). The DUS 500 sends an SNMP "cold boot" trap to the configured trap destination IP addresses (at least one being the MgmtApp 200). The DUS 500 displays OSD login screen. The DUS 500 user submits username and password. The DUS 500 establishes an ASMP session with the MgmtApp 200 and submits the username and password for authentication using the ASMP login messages. The MgmtApp 200 authenticates the username and password. The MgmtApp 200 verifies if the user is allowed login from the DUS 500. The MgmtApp 200 looks up the mode the user is configured to use for this DUS 500 (assumed desktop in this usecase). The MgmtApp 200 reads the primary target device 300 and looks up the associated DIP 400. If the DIP 400 is marked as unavailable an attempt to wake up the target device 300 using WOL protocol is attempted threes times. The MgmtApp 200 opens an ADSAP2 session with the DUS 500 and DIP 400. The MgmtApp 200 looks up the media session properties configured for the user. The MgmtApp 200 builds an X.509 Cert for the Session. One for the DUS 500 and one for the DIP 400. The cert contains amongst other items: DUS/DIP IP address, Session Retry Timeout value, Session Retry Count, Media Session Properties. The MgmtApp 200 writes the cert to the DIP 400 and DUS 500 using ADSAP2 protocol. The MgmtApp 200 closes the ADSAP2 session. The DIP 400 stores the Session Cert persistently, so that it can accommodate fast re-connection on power cycling/reset on the target device 300. The MgmtApp 200 sends an ASMP Login reply with successful status to the DUS 500. The DUS 500 on receiving the successful login response, informs the user and establishes an AVSP control channel with the DIP 400 exchanging X.509 session certs. On establishment of the AVSP control channel, the DUS 500 and DIP 400 configure their respective media transfer hardware sessions, but do not enable them yet. The DUS 500 starts a fast keepalive request on the channel. The DIP 400 on receiving the keepalive from the DUS 500 enables its media streams. The DUS 500 on receiving the initial keepalive reply enables its media streams. The media session is now established.

It should be noted that DUS 500 may have been powered up already and have been used for previous connections. In this case, to establish a connection the DUS 500 user brings up the DUS 500 OSD and logins from there. If DUS 500 is configured for Auto login access, then the login OSD is not displayed, the configured autologin username and password is submitted by the DUS 500 to the MgmtApp. 200.

If there was an error the MgmtApp 200 returns a login response indicating the error to the DUS 500. The DUS 500 displays the appropriate message to the user. In the event of a connection failure, the DUS 500 will attempt to re-establish the AVSP control channel with the DIP 400 for the "Timeout Period" indicated in the cert. If the attempt fails it will retry the connection attempt (after a back off for the same time period), the number of times it retries is indicated in the "Session Retry Count." An unavailable DIP 400, or failure to open an ADSAP2 session with the DIP 400 associated with the target device 300, the MgmtApp 200 will check if the target device 300 responds to a poll, if not it sends a WOL packet to the target device 300 and will make three attempts to wake up the target device 300, if the DIP 400 is unresponsive after three attempts the secondary target device is attempted. The DUS 500 is informed of progress with an ASMP login reply (indicating status and that login is still in progress). AVSP keepalive are sent by the DUS 500 every 500 ms.

Figure 23:
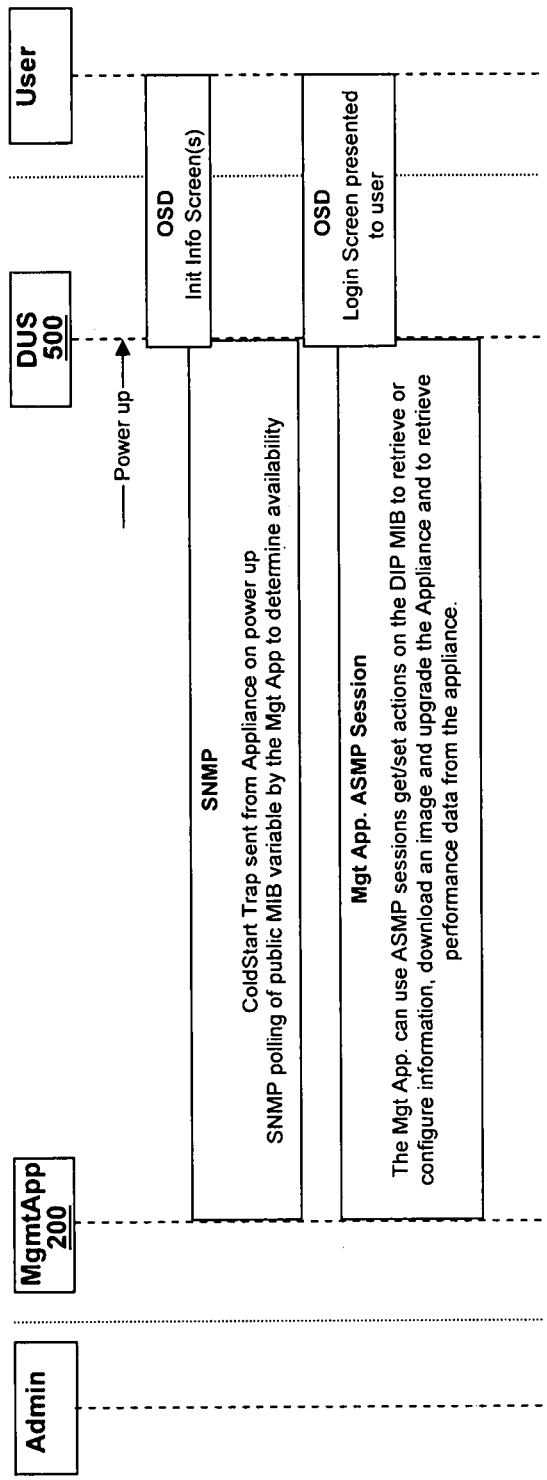
FIG. 23: an exemplary diagram illustrating power-up of a DUS (login) in desktop/matrix configuration.

The procedures involved with power up of a DUS 500 are illustrated in FIG. 23. In FIG. 23, it is assumed that DUS 500 has been installed and commissioned as previously described. It is also assumed that the DUS 500 has been configured for desktop mode with login access and the DUS 500 uses the default DHCP IP addressing mode.

As shown in FIG. 23, the process begins by a DUS 500 user powering up the DUS 500. The DUS 500 displays an initializing OSD message sequence to inform the user of powerup progress. The DUS 500 initialization completes and searches for an IP address through DHCP. The DUS 500 configures its IP address data. The DUS 500 can now respond to MgmtApp 200 SNMP polls (to determine availability). The DUS 500 sends an SNMP "cold boot" trap to the configured trap destination IP addresses (at least one being the MgmtApp 200). The MgmtApp 200 can update its availability status for the DUS 500. The DUS 500 displays the OSD login screen. The DUS 500 may receive and respond to ASMP requests to configure or retrieve data. The DUS 500 is ready to initiate login and subsequent connection establishment. It should be noted that if DUS 500 is configured for autologin, then the login OSD is not displayed.

Figure 24:
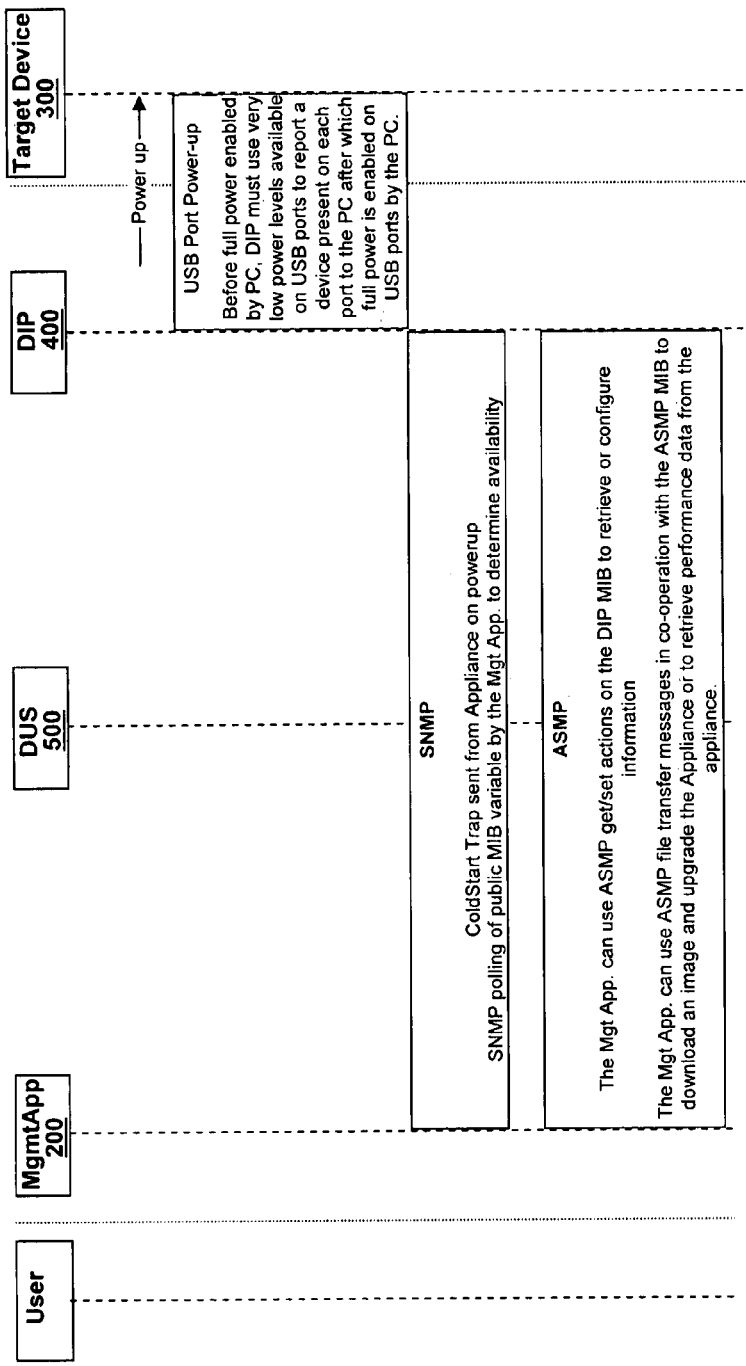
FIG. 24: an exemplary diagram illustrating power-up of a DIP in desktop/matrix configuration.

The behavior on power up of the DIP 400 is described in accordance with FIG. 24. In FIG. 24, it is assumes that the DIP 400 has been installed and commissioned as described previously described. The DIP 400 is a slave device and has no awareness to the configuration it is operating in (e.g. extender or desktop/matrix). The DIP 400 uses the default DHCP IP addressing mode.

As shown in FIG. 24 the process begins by target device 300 being powered up. The DIP 400 powers up as soon as it has obtained power from the target device 300 via its USB ports. The DIP 400 initialization completes and searches for an IP address through DHCP. The DIP 400 configures its IP address data. The DIP 400 can now respond to MgmtApp 200 SNMP polls (to determine availability). The DIP 400 sends an SNMP "cold boot" trap to the configured trap destination IP addresses (at least one being the MgmtApp 200). The MgmtApp 200 updates its availability status for the DIP 400. The DIP 400 may receive and respond to ASMP requests to configure or retrieve data. The DIP 400 is ready to accept connection requests.

It should be noted that the DIP 400 must be able to powerup and be in a state to let the target device 300 know that a keyboard is present before the target device 300 determines that it cannot see a keyboard. Further it should be noted that the DIP 400 may need to have an independent power supply as it may draw too much current to be supplied through two USB port connections.

The system needs to be able to accommodate the possibility of a target device 300 being reset, requiring rapid connection re-establishment or the possibility of the DIP 400 being replaced. The following description describes what happens when a target device 300 is power cycled when a DUS 500 and DIP 400 are connected a desktop or extender configuration.

The target device 300 is powered down (or reset), resulting in abrupt power down of the DIP 400. The DUS 500 stops receiving AVSP keepalive replies (every 500 ms). After missing three consecutive replies the DUS 500 declares the connection with the DIP 400 broken. The DUS 500 resets its open SSL/TCPIP associations with the DIP 400 (media streams and AVSP control session), and displays a message indicating that the connection is broken with the DIP 400. If the session cert "Session retry Count" is non zero, the DUS 500 will backoff for a time indicated by the Session Cert "Session retry timeout" value and then attempts to re-establish the AVSP control session with the DIP 400. The DUS 500 will keep retrying the establishment of the AVSP control session for the "Session Retry Timeout" period, after which it will terminate the retry attempt. On terminating each retry attempt the DUS 500 sends an SNMP trap informing of the failed connection attempt. The DUS 500, after waiting for a period equal to the "session retry timeout" commences retrying the establishment of a connection with the DIP 400. The cycle repeats until the "Session Retry Count" have been reached or the AVSP control session has been established. When the AVSP control session has been established, the connection setup completes as described in the DUS login/connection usecase after the AVSP session is established.

It should be noted the if a DIP 400 had been replaced, the SSL authentication with the DIP 400 would fail and any attempt to re-establish the connection by the DUS 500 terminates and a message is displayed to inform the DUS 500 user. An SNMP trap is sent to the MgmtApp 200 informing it of the connection termination.

On restart of target device 300 and subsequent DIP 400 powerup the time it takes to re-establish a connection on the DUS 500 and DIP 400 should be fast enough to enable a DUS 500 user to access the target device BIOS.

The following description describes system behavior when a DUS 500 is power cycled when a connection is established. The DUS 500 is powered down, resulting in abrupt power down of the DUS 500. The DIP 400 stops receiving AVSP keep alive requests (every 500 ms). After missing three consecutive requests the DIP 400 declares the connection with the DUS 500 broken. The DIP 400 resets its open SSL/TCPIP associations with the DUS 500 (media streams and AVSP control session). The DIP 400 sends an SNMP trap to the configured trap destination addresses (at least one being the MgmtApp 200) indicating that the connection has terminated abruptly. The DIP 400 is now ready to accept another AVSP control session establishment request (re-establish the connection again).

The following description describes the behavior of DUS 500 and DIP 400 in the event of a cable or network failure when a connection exists. For this description, it is assumed that the network or cable fault breaks communication in both directions.

A network or cable fault occurs. The DUS 500 misses keepalive responses. After missing three consecutive responses, it will clear the open association with the DIP 400, and commences retrying the establishment of the AVSP control session. The DIP 400 misses keepalive requests, after missing three consecutive requests the DIP 400 will clear open associations so it can facilitate the re-establishment of the connection with the DUS 500. On resumption of the network/cable connectivity the DUS 500 will re-establish the AVSP control channel with the DIP 400 provided the network/cable fault was repaired before the DUS 500 "session retry" count was reached.

It should be noted that a network fault that has been recovered before the DUS 500 detects three consecutive missing keepalive replies (approx 1.5 seconds) will be tolerated without any interruption, other then any network level TCPIP retries that may occur. A network or cable failure that results in the DUS 500 having exhausted its session retry count will result in DUS 500 terminating the connection attempts. The DUS 500 will inform the DUS 500 user by displaying a message and send an SNMP trap to inform the MgmtApp 200. Similarly, the DIP 400 will have closed its open associations with the DUS 500 and informed the MgmtApp 200 of a failed connection. A network/cable fault break in communication in the DUS 500 to DIP 400 direction will cause the DIP 400 to behave as indicated in the DUS 500 power-down use case. A network/cable fault break in communication in the DIP 400 to DUS 500 direction will cause the DUS 500 to behave as indicated in the DIP 400 power-down usecase.

Figure 25:
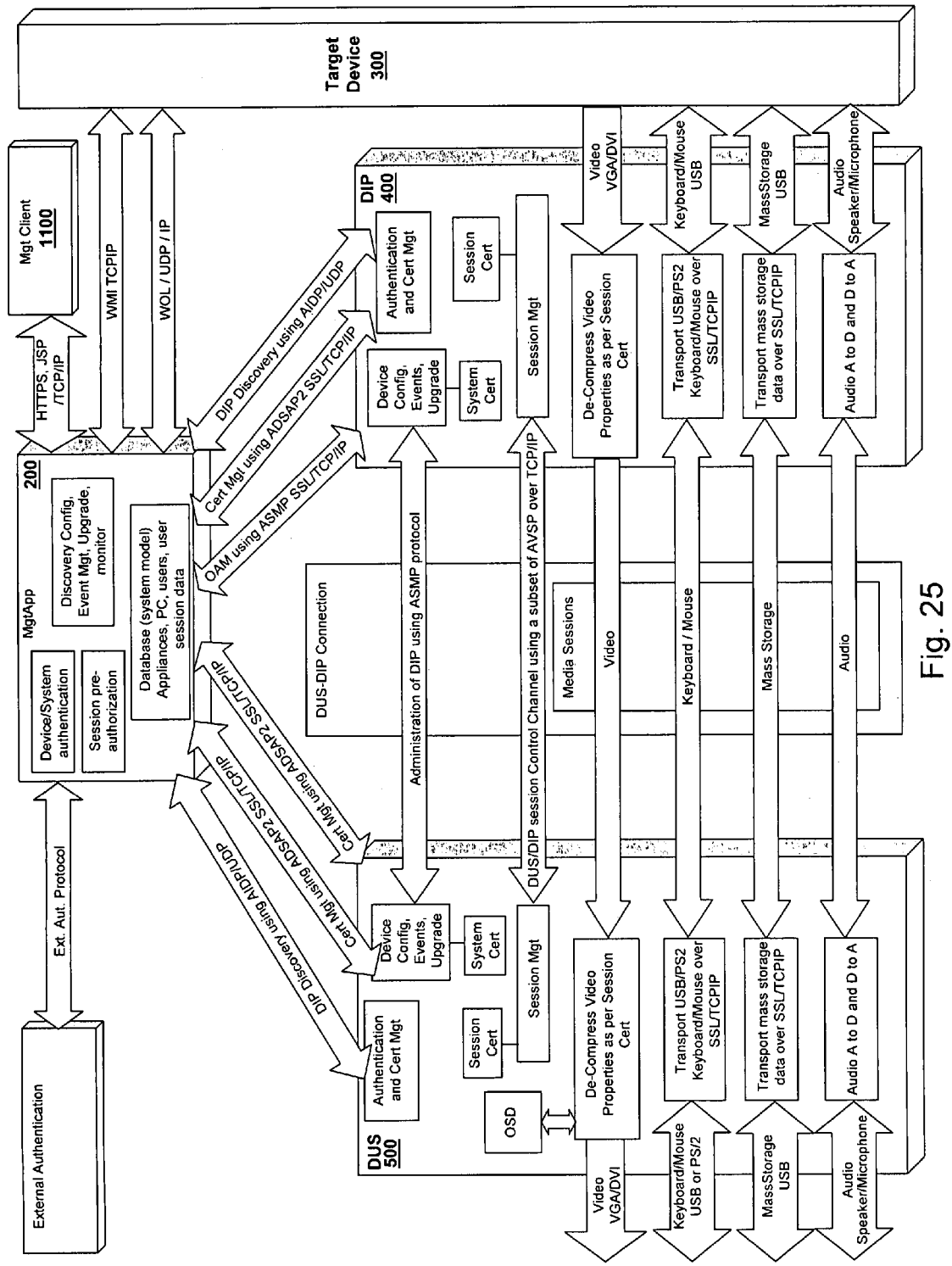
FIG. 25: an exemplary functional model of desktop and matrix configuration.

FIG. 25 is an exemplary functional model of desktop/matrix configuration. FIG. 25 summarizes operation of DUS 500 and DIP 400 in desktop/matrix configuration as previously described.

Figure 26:
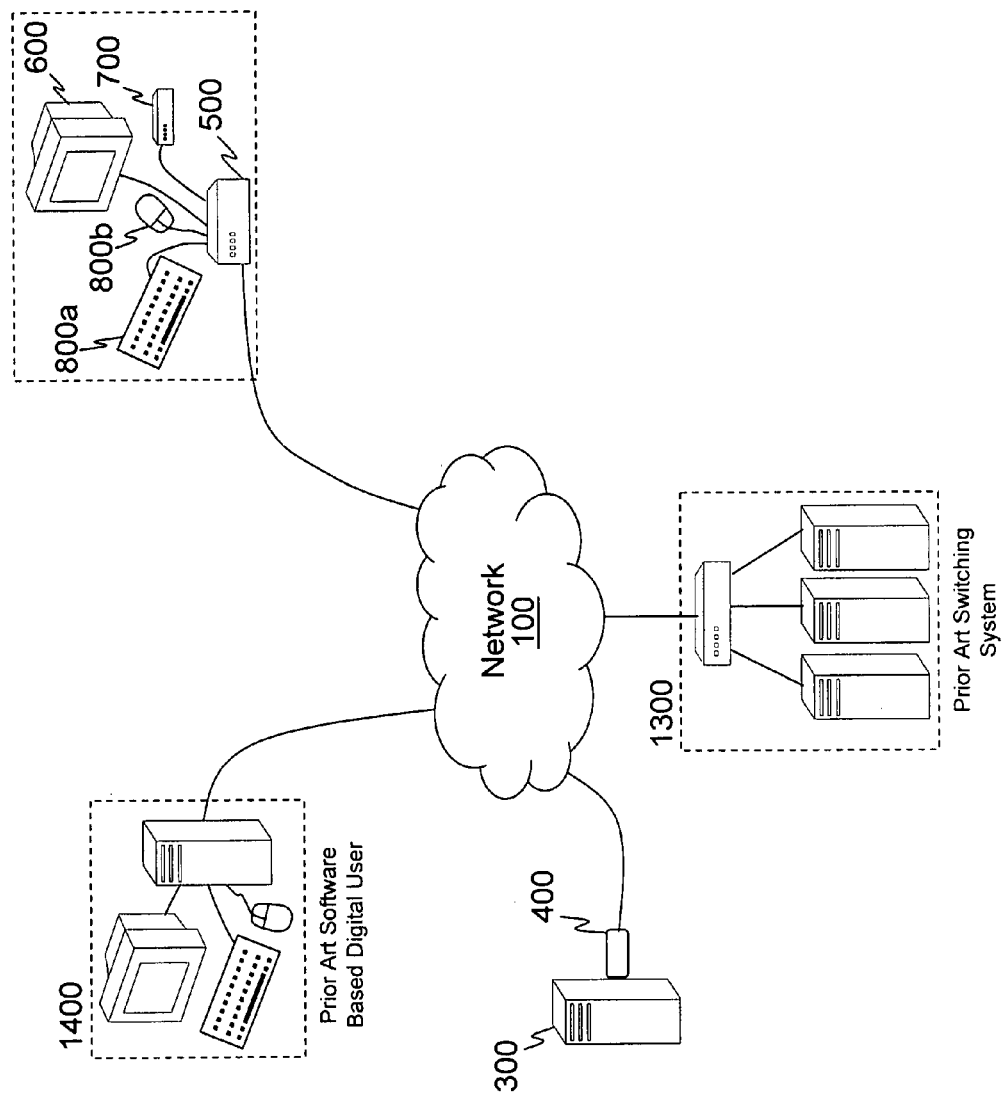
FIG. 26: an exemplary diagram illustrating interoperability of DUS and DIP with prior art KVM system.

FIG. 26 is a diagram illustrating the interoperability between prior art KVM switching products and DUS 500 and DIP 400. An example of prior art KVM switching products are Avocent DSR products. These products are described in submitted document entitled "DSR Switch Installer/User Guide" published by Avocent Corporation in 2005, Document No. 590-419-501B, which is incorporated by reference in its entirety. In this system, software allows digital user 1400 to access the switching system 1300 over network 100. The communication protocols used for DUS 500 and DIP 500 are different from those used the prior art system. However, a digital user 1400 will be able to access a DIP 400 by modifying software on the digital user station or by inserting a proxy server (not shown) between digital user 1400 and DIP 400. Likewise DUS 500 will be able to access the switching system 1300 by modifying the software installed on the switch in the switching system 1300 or by inserting a proxy server (not shown) between DUS 500 and switching system 1300. Further, DUS 500 and DIP 400 will be able to access any prior KVM system when a prior art communication protocol is able to be converted into a format acceptable to DUS 500 and DIP 400. For switch products with "local port" switching access DIP 400 can be modified to support seamless operation. This seamless operation allows a DIP 400 to "present" as a list of devices rather than a single device—thus a user can select which device to connect to and the DIP 400 plays out the local switch operation for the attached KVM switch. It should be noted that DUS 500 and DIP 400 can be coexist on a network 100 with prior art switching systems with out interference.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of associating an interfacing module, having unique interfacing module identification data, connected to a network with a target network device connected to the same network comprising the steps of:

physically coupling the interfacing module to a peripheral port of a target network device both the interfacing module and the target network device having their own unique addresses for sending and receiving communications on the network;

communicating the interfacing module identification data to the target network device through the physical coupling;

storing the interfacing module identification data in a memory portion of the target network device;

at a remote location on the network having a remote device distinguished from both the interfacing module and the target network device by the remote device at the remote location having another unique address for communications on the same network:

(1) polling addresses on the network to discover the existence of the target network device on the network;

(2) determining the network address of the target network device; and (3) using the network address of the target network device to read the interfacing module identification data from the memory portion of the target device via the same network and extracting from the memory portion of the target network the network address of the interfacing module that is physically coupling the target network device;

storing in a database at the remote location an association among a name identifier of the target network device, the network address of the target network device, and the network address of the interfacing module; and discovering when the interfacing module has disconnected from the target network device.

2. The method of claim 1, further comprising the step of:

creating an alpha-numeric identifier for the interfacing module based on a unique alpha-numeric identifier of the target device.

3. The method of claim 1, wherein coupling an interfacing module to a peripheral port of a target network device includes coupling the interfacing module to a USB type port of target network device.

4. The method of claim 1, wherein said interfacing module identification data includes:

a product ID; and a serial number.

5. The method of claim 1, further comprising the step of:

at the same remote location, monitoring when an interfacing module becomes associated with a new target network device.

6. The method of claim 5, wherein said monitoring step further comprises creating a log file.

7. A virtualized desktop system for communicating with a target device over a network, the target device communicating data through a peripheral port and having a unique address for sending and receiving communications on the network, comprising:

a digitalizing interface module configured to be physically coupled to said target device at said peripheral port to interface data from said peripheral port to said network, the digitalizing interface module having a unique address for sending and receiving communications on the network, the digitalizing interface module communicating for storage in a memory of the target device a corresponding interface module identifier when the digitalizing interface module is physically coupled to the target device;

a digital user station, connected to said network, configured to communicate with the target device via a path through said network and through said digitalizing interface module physically coupled to said target device;

a target device database storing a list of target device identifiers, network addresses of the target devices, and information associating digitalizing interface modules coupled to respective ones of the target devices, a module database storing a list of interfacing module identifiers associated with said digitalizing interfacing modules; and a management application polling network addresses to discover target devices on the network, and when the management application discovers a target device on the network, extracts the corresponding interface module identifier for the digitalizing interface module physically coupling the target device and associates the digitalizing interface module to the discovered target device when the digitalizing interface module is coupled to said target device.

8. The virtualized desktop system of claim 7, wherein said target device comprises a memory portion that receives and stores an interfacing module's identification data when an interfacing device is coupled to said target device.

9. The virtualized desktop system of claim 7, wherein said interfacing module identifiers include:

a product ID; and a serial number.

10. The virtualized desktop system of claim 7, wherein said peripheral port is a USB type.

11. The virtualized desktop system of claim 7, wherein said management application monitors when interfacing modules are coupled to respective target devices by creating a log file.

12. The virtualized desktop system of claim 7, wherein said management application associates each interfacing module to respective target devices when the interfacing modules are coupled to said target devices by associating interfacing module identifier with target device network addresses.

13. The virtualized desktop system of claim 7, wherein said management application associates interfacing modules to respective target devices when said interfacing modules are coupled to said target devices by creating an identifier for the interfacing module by combining said target device identifiers and respective interfacing module identifiers.

* * * * *